United States Patent
Lim et al.

(10) Patent No.: US 12,521,349 B2
(45) Date of Patent: Jan. 13, 2026

(54) INITIAL BURST RELEASE CONTROLLED DEPOT COMPOSITION AND A METHOD THEREOF

(71) Applicant: Tionlab Therapeutics, Yongin-si (KR)

(72) Inventors: Duck Soo Lim, Suwon-si (KR); Eun Joo Lee, Hwaseong-si (KR)

(73) Assignee: TIONLAB THERAPEUTICS, Gyeonggi-Do (KR)

( * ) Notice: Subject to any disclaimer, the term of this patent is extended or adjusted under 35 U.S.C. 154(b) by 1040 days.

(21) Appl. No.: 17/606,757

(22) PCT Filed: Oct. 14, 2021

(86) PCT No.: PCT/KR2021/014179
§ 371 (c)(1),
(2) Date: Oct. 26, 2021

(87) PCT Pub. No.: WO2022/163966
PCT Pub. Date: Aug. 4, 2022

(65) Prior Publication Data
US 2022/0296524 A1    Sep. 22, 2022

(30) Foreign Application Priority Data

Jan. 29, 2021 (KR) .................. 10-2021-0013387
Sep. 3, 2021 (KR) .................. 10-2021-0117287

(51) Int. Cl.
*A61K 9/16* (2006.01)
*A61K 38/26* (2006.01)

(52) U.S. Cl.
CPC .......... *A61K 9/1694* (2013.01); *A61K 9/1617* (2013.01); *A61K 9/1647* (2013.01); *A61K 38/26* (2013.01)

(58) Field of Classification Search
CPC .... A61K 9/0019; A61K 9/113; A61K 9/1617; A61K 9/1647; A61K 9/1694; A61K 9/19; A61K 31/195; A61K 31/197; A61K 31/198; A61P 3/04; A61P 3/10
See application file for complete search history.

(56) References Cited

U.S. PATENT DOCUMENTS 10,105,443 B2    10/2018  Emanuel
2008/0131513 A1*  6/2008  Woo ............... A61K 47/183
                                                       514/17.5

FOREIGN PATENT DOCUMENTS

| CN | 103110623 A | 5/2013 |
| CN | 104107165 A | 10/2014 |
| JP | 5681626 B2 | 3/2015 |
| KR | 20060093300 A | 8/2006 |
| KR | 100963435 B1 | 6/2010 |
| KR | 20100079344 A * | 7/2010 |
| KR | 101307729 B1 | 9/2013 |
| KR | 101686986 B1 | 12/2016 |
| WO | 2011080733 A1 | 7/2011 |
| WO | 2014169725 A1 | 10/2014 |

OTHER PUBLICATIONS

Shim et al., KR 20100079344 A, English translation, publ. Jul. 8, 2010 (Year: 2010).*
European Search Report in European application No. 21923375.6 dated Oct. 25, 2024.
Office Action issued Aug. 20, 2025 in CN Application No. 202180087097.2.

* cited by examiner

*Primary Examiner* — Sarah Pihonak
(74) *Attorney, Agent, or Firm* — Panitch Schwarze Belisario & Nadel LLP

(57) ABSTRACT

A depot composition including a hydrophobic amino acid in a microsphere is provided. The depot composition is capable of controlling the initial burst release of an excess amount of the active ingredient in a formulation including a biodegradable polymer and an active ingredient. The depot composition has excellent suspending ability, and is able to uniformly and continuously obtain the effect of the active ingredient even when an ordinary user uses the composition as a formulation for injection.

7 Claims, 16 Drawing Sheets

[FIG 1A]
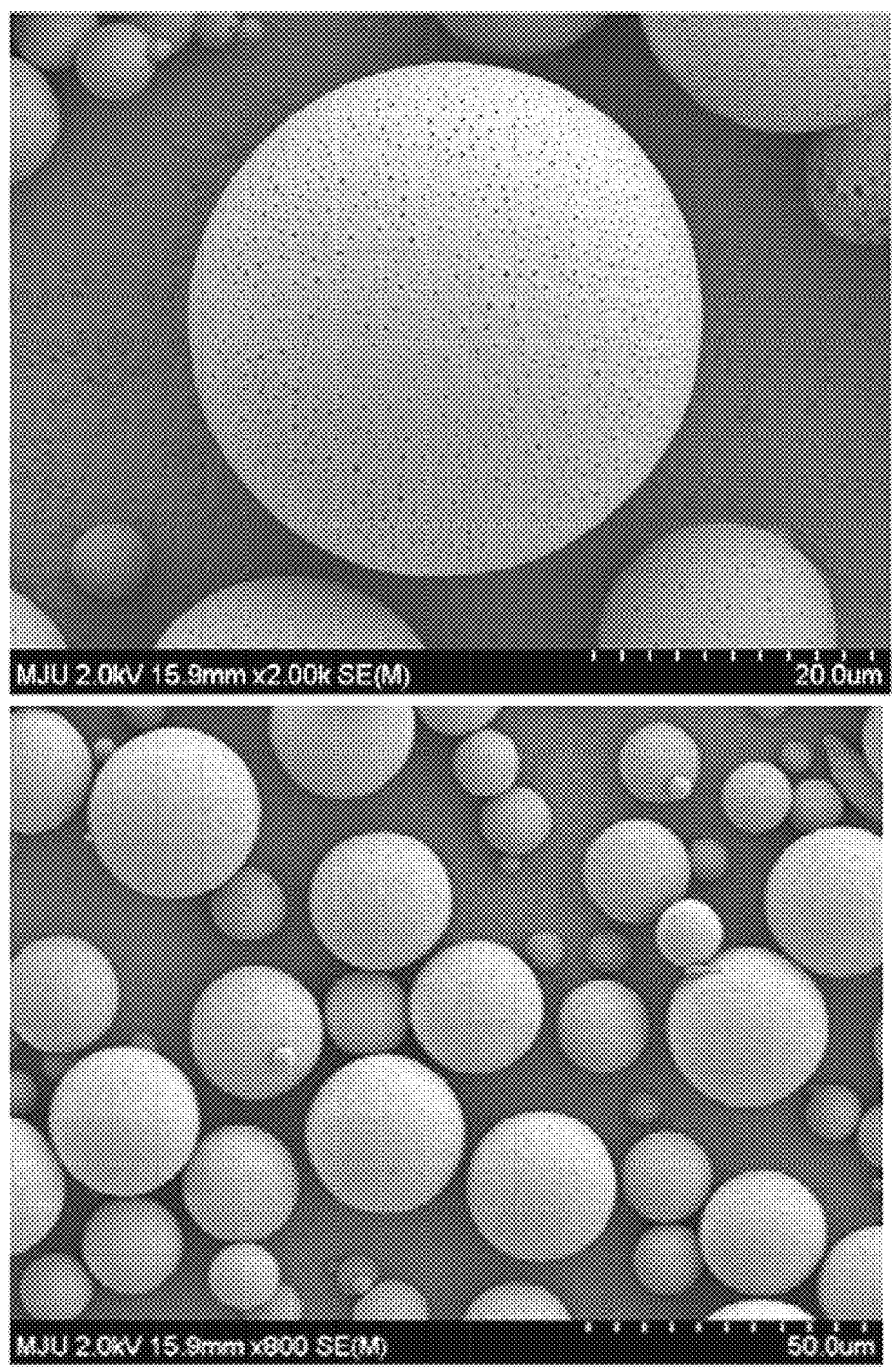
Comparative Example 1(Batch No. 111)

[FIG 1B]
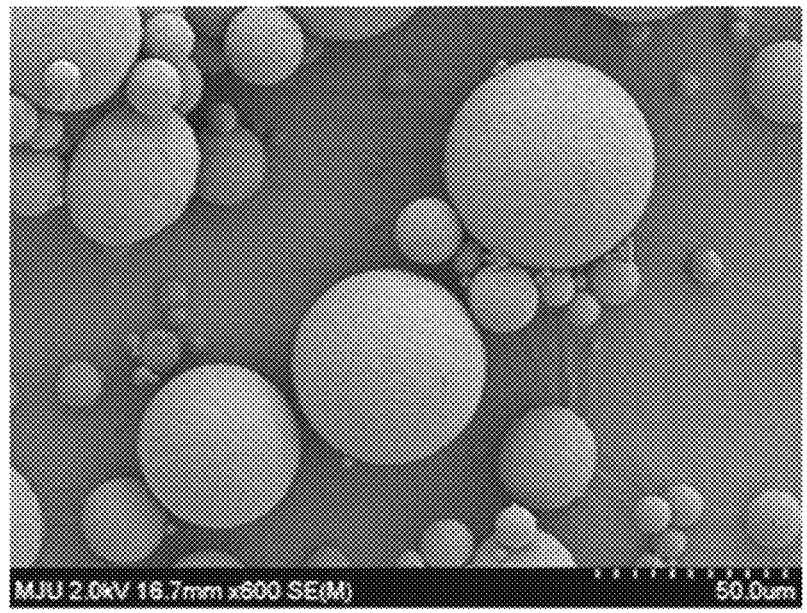
Example 1-1 (Batch No. 114)
[FIG 1C]
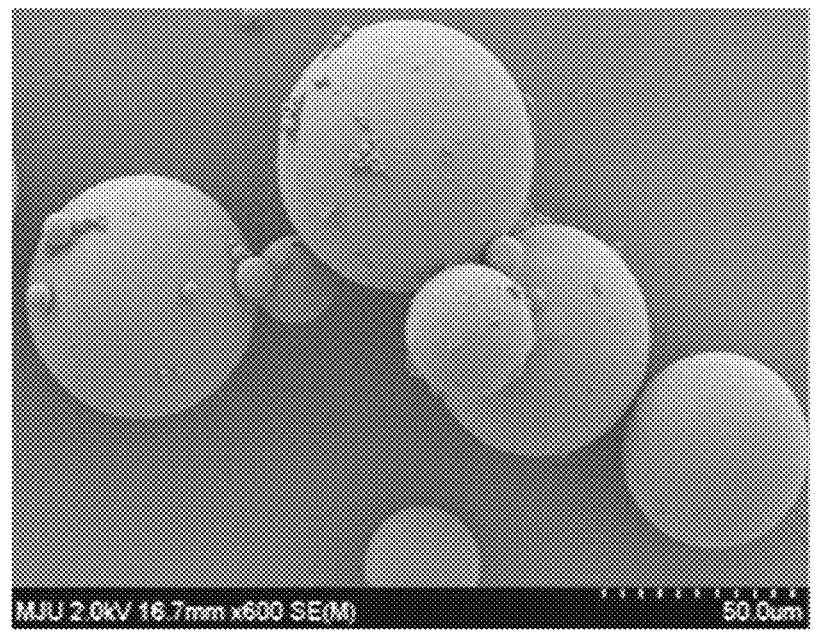
Example 1-2 (Batch No. 134)

[FIG 1D]
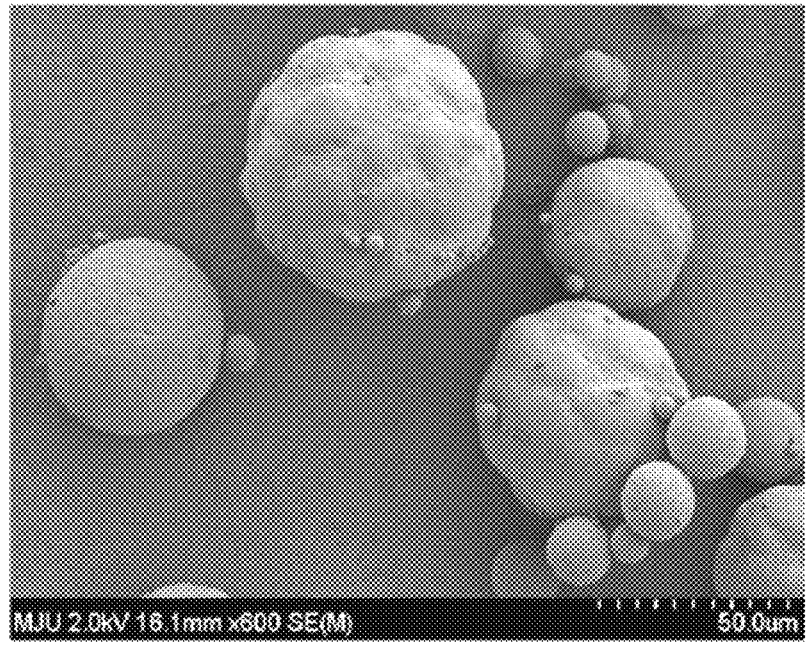
Example 1-3 (Batch No. 139)
[FIG 1E]
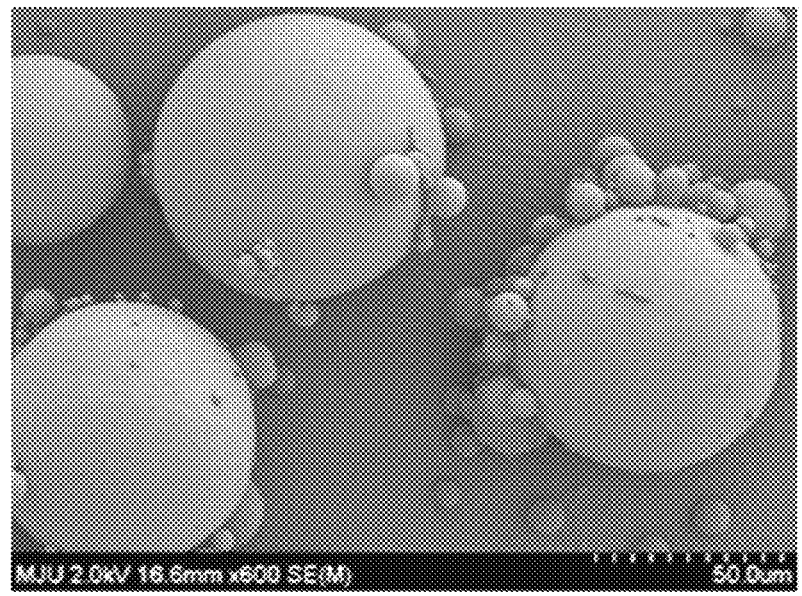
Example 1-4 (Batch No. 137)

[FIG 1F]
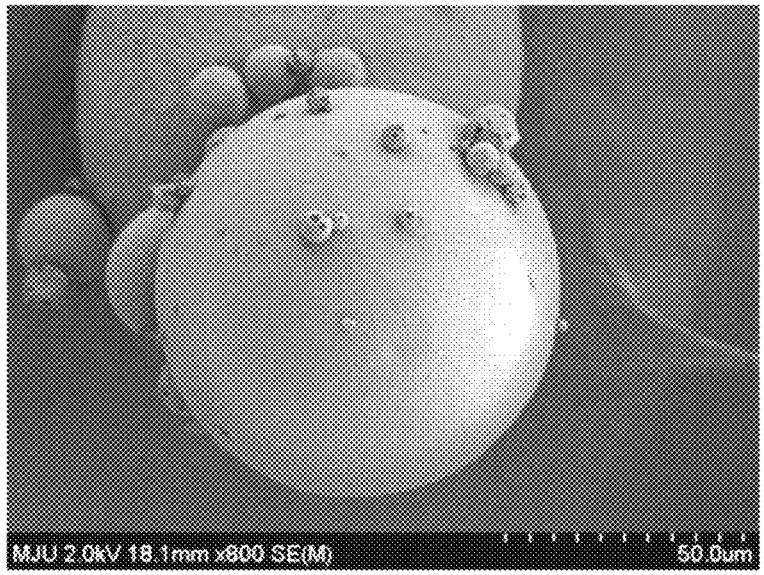
Comparative Example S-1 (Batch No. SMG21-008)
[FIG 1G]
Example S-1 (Batch No. SMG21-009)

[FIG 2A]
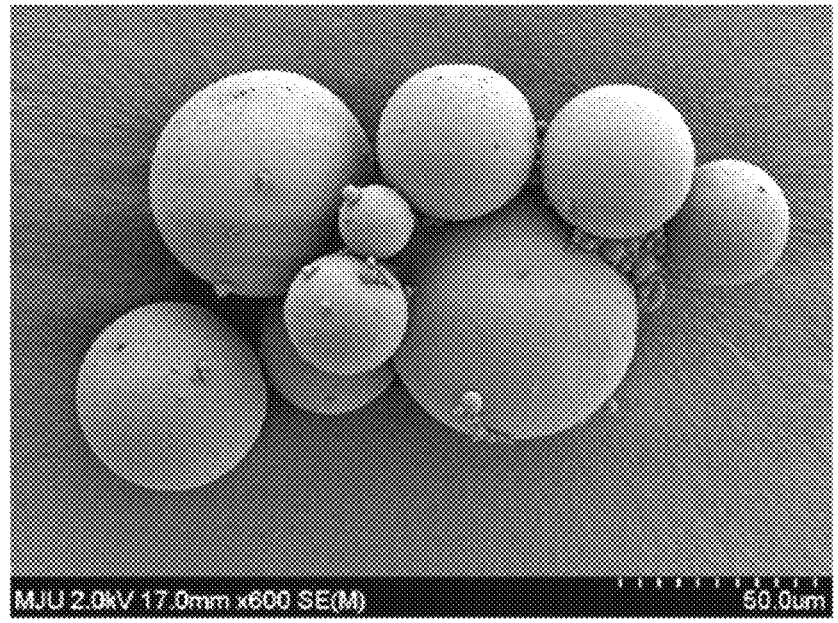
Example 2-1 (Batch No. 130)
[FIG 2B]
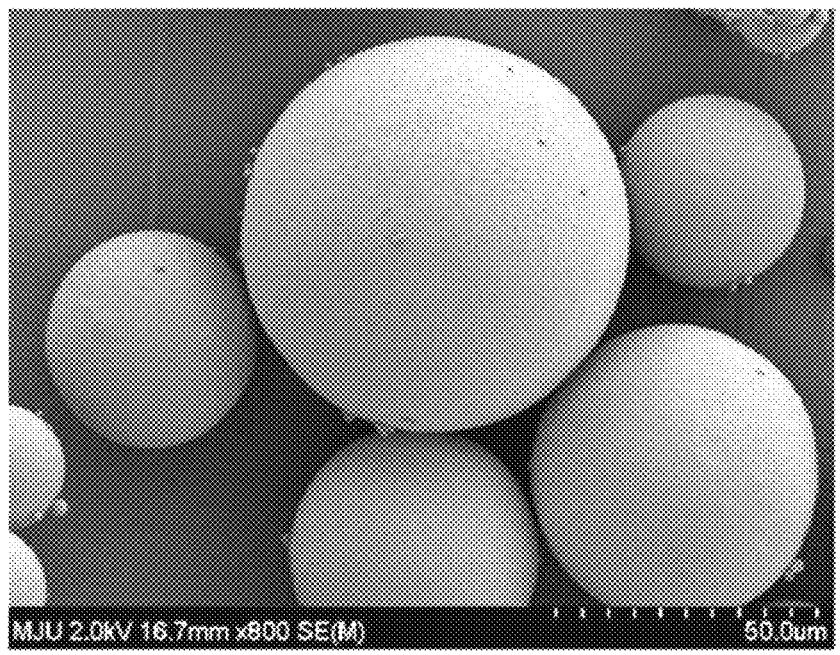
Example 2-2 (Batch No. 131)

[FIG 2C]
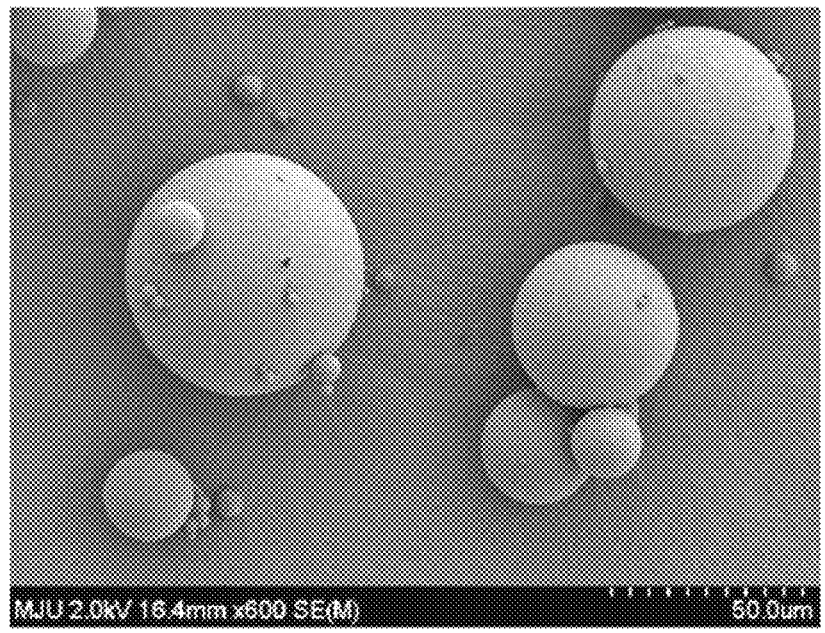
Example 2-3 (Batch No. 132)
[FIG 2D]
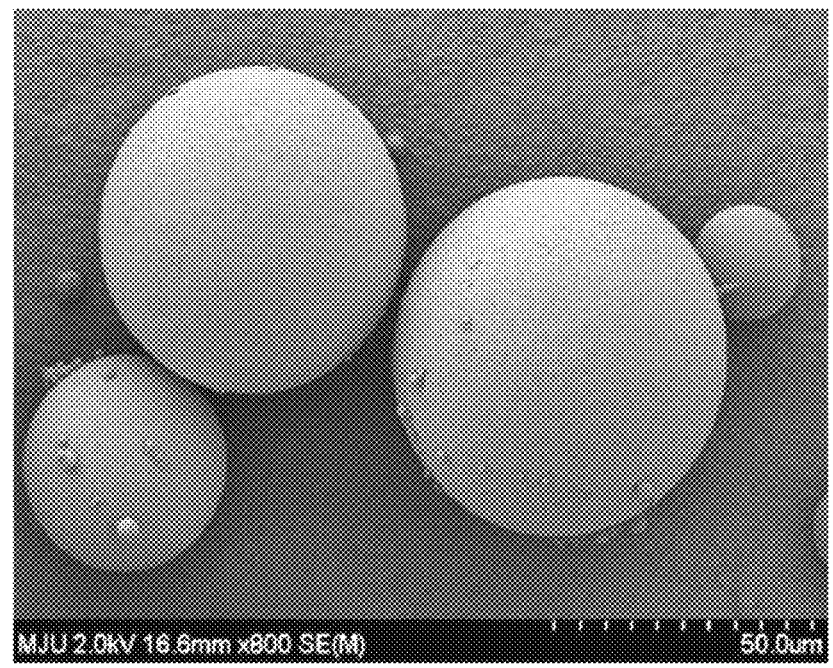
Example 2-4 (Batch No. 133)

[FIG 2E]
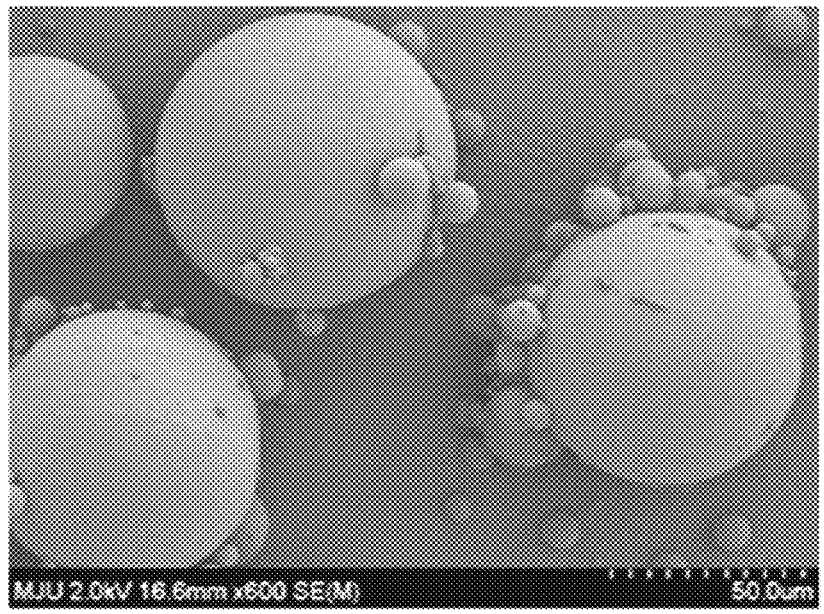
Example 2-5 (Batch No. 137)
[FIG 3A]
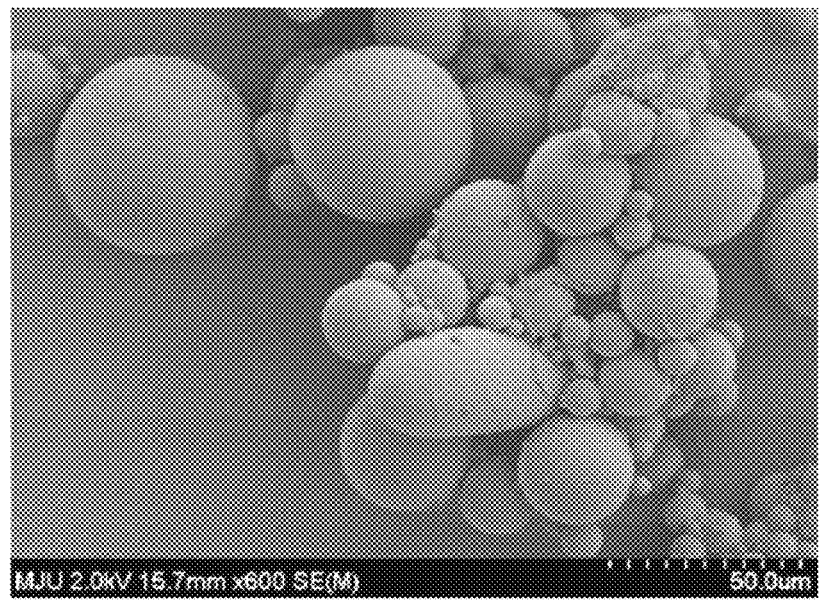
Comparative Example 2 (Batch No. 100)

[FIG 3B]
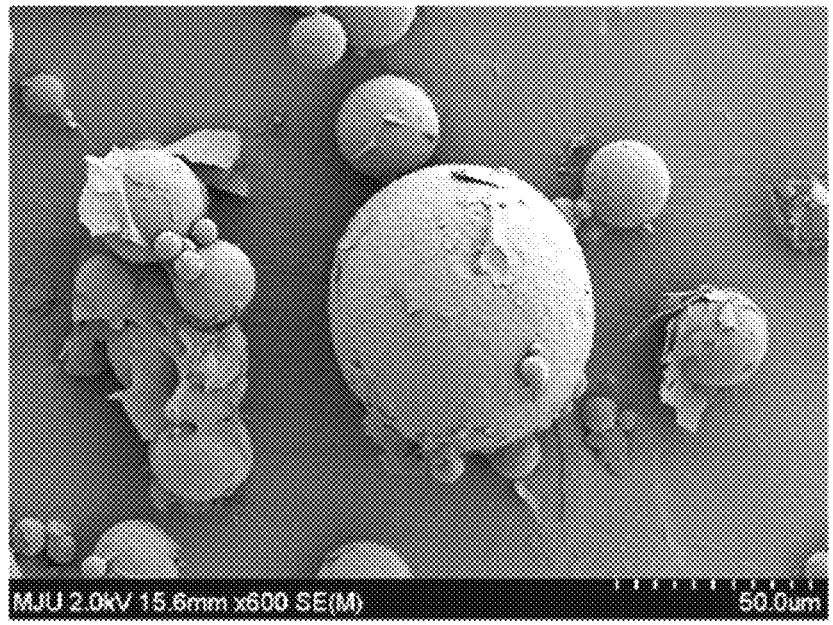
Comparative Example 3 (Batch No. 100L)
[FIG 4A]
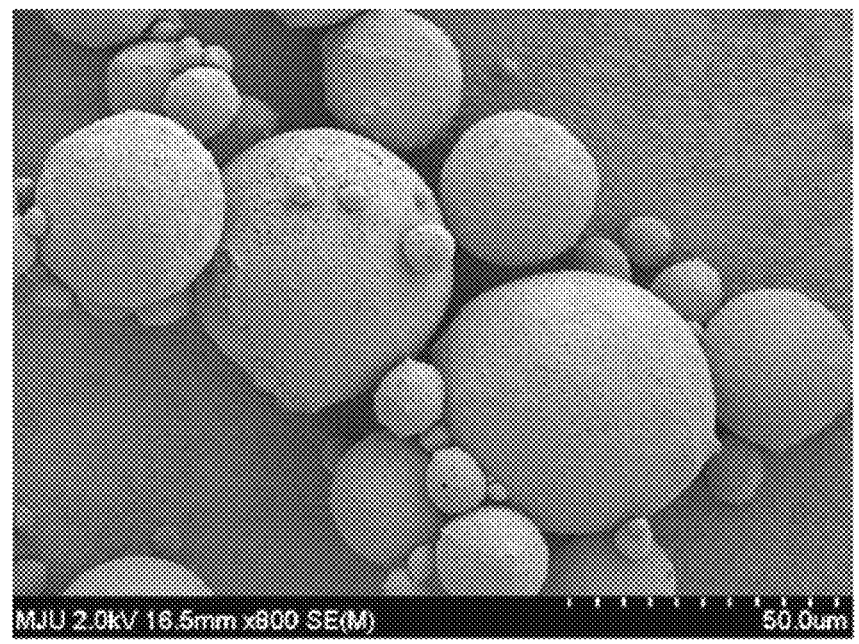
Comparative Example 4-1 (Batch No. 115)

[FIG 4B]
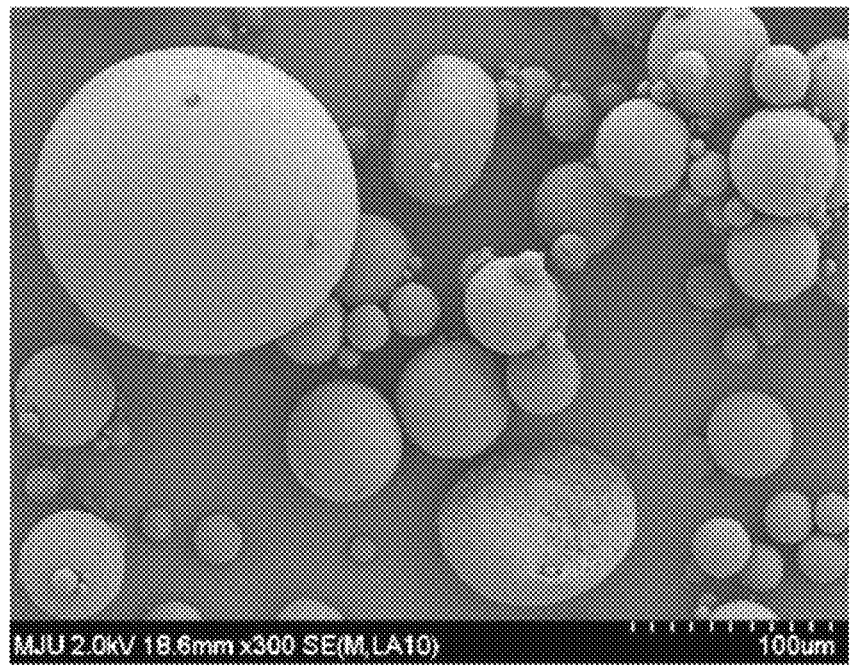
Comparative Example 4-2 (Batch No. 117)
[FIG 5A]
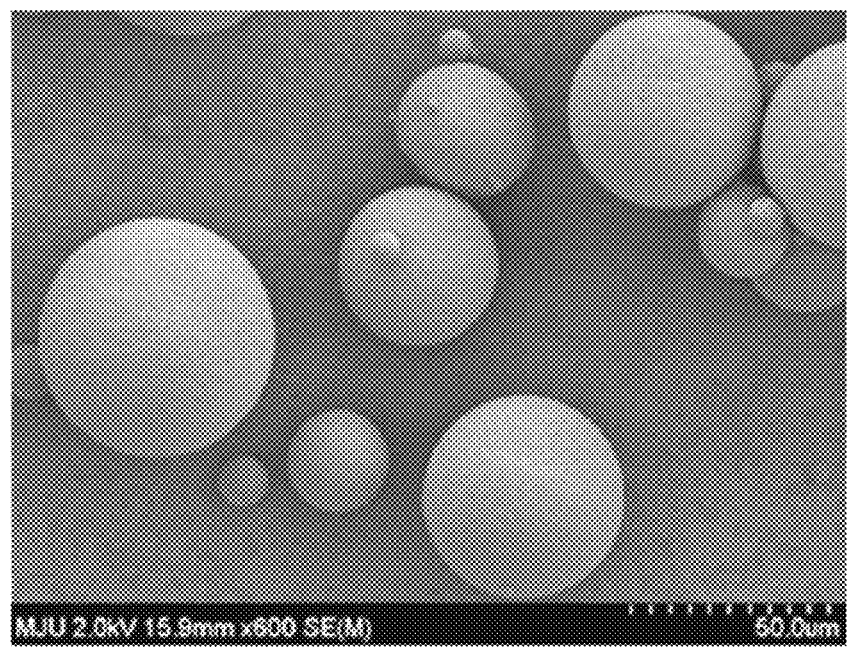
Example 3-1 (Batch No. LRG84I-111)

[FIG 5B]
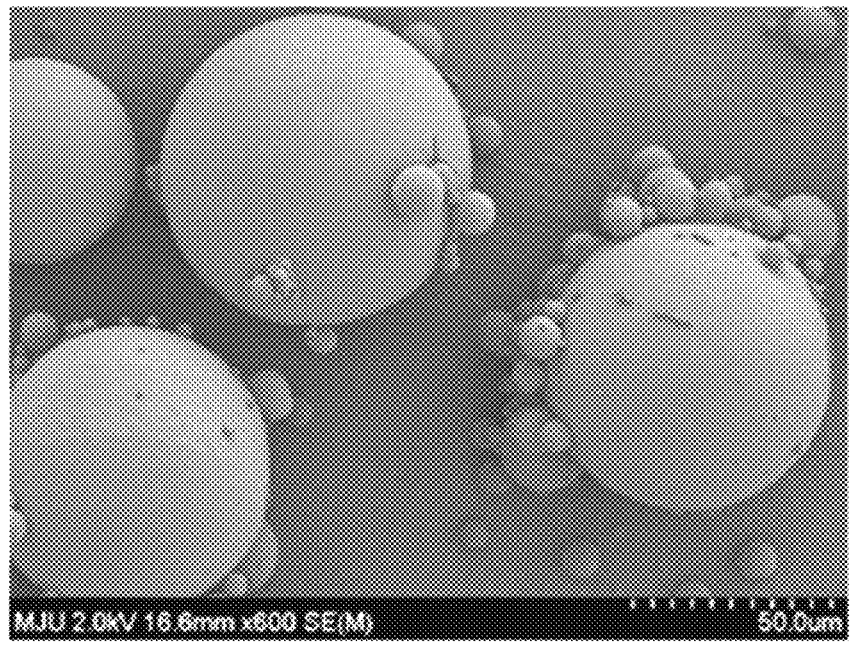
Example 3-2(Batch No. LRG84I-137)
[FIG 5C]
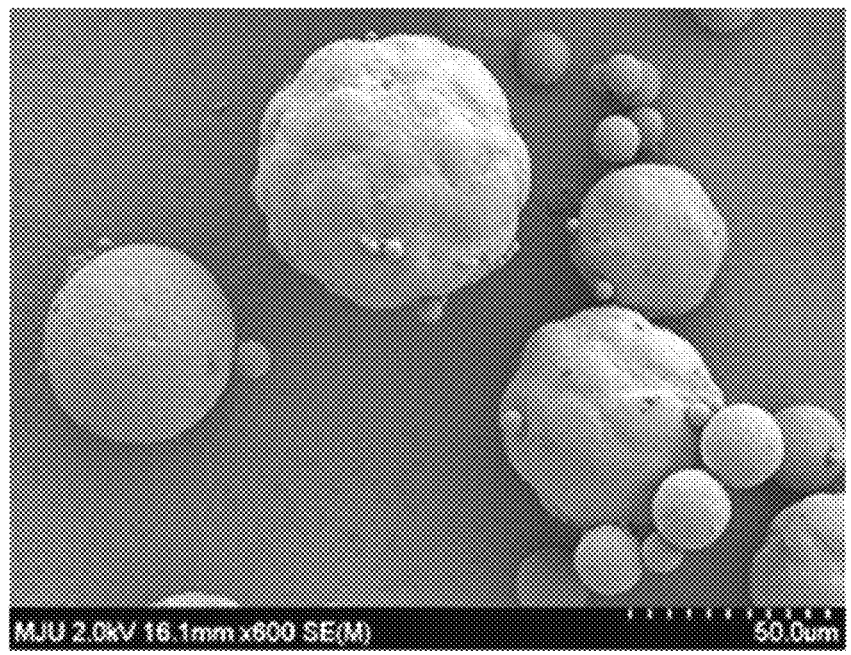
Example 3-3(Batch No. LRG84I-139)

[FIG 6A]
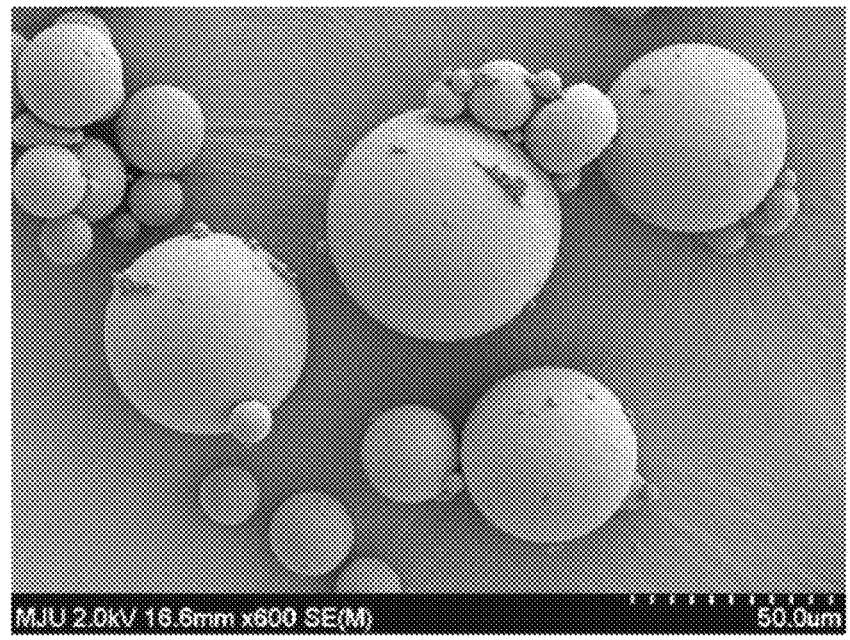
Example 4-1(Batch No. LRG841-146)

[FIG 6B]
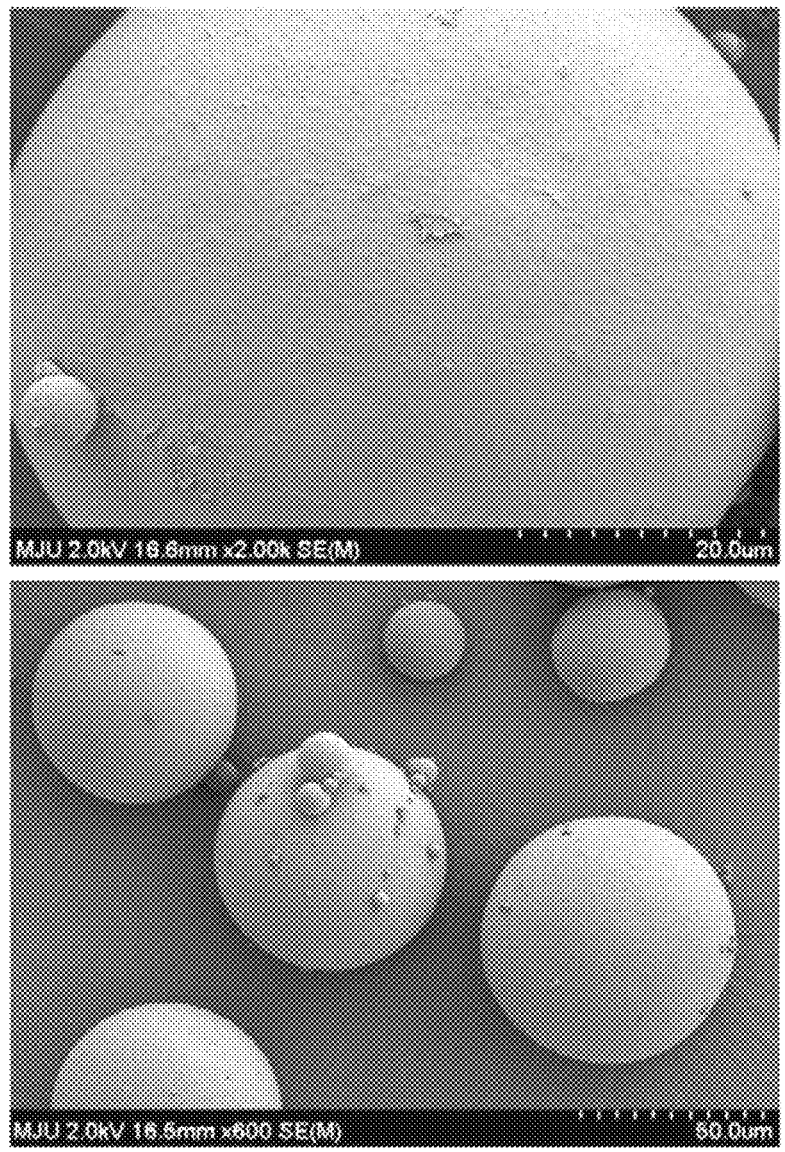
Example 4-2(Batch No. LRG841-148)

[FIG 6C]
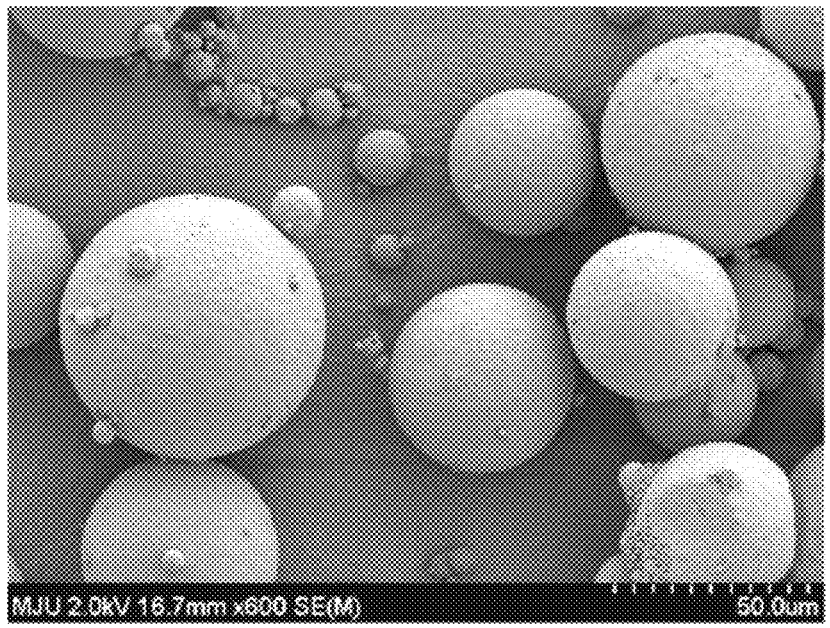
Example 4-3 (Batch No. LRG841-149)
[FIG 6D]
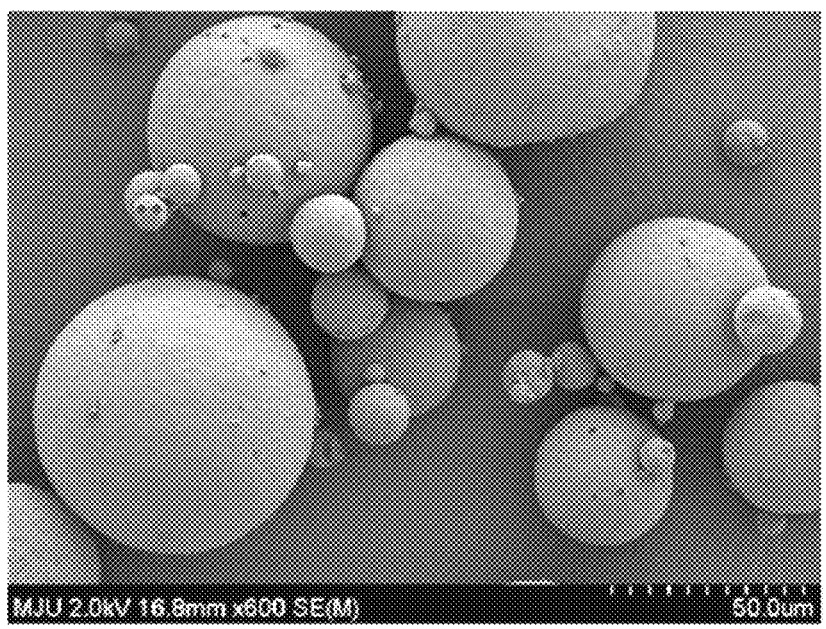
Example 4-4 (Batch No. LRG841-150)

[FIG 7]
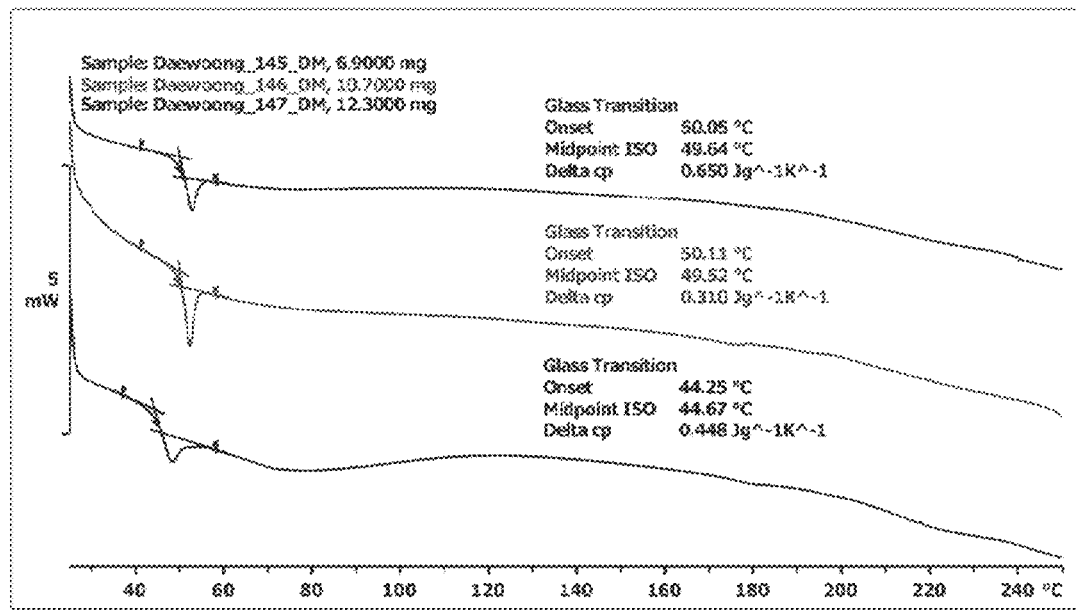

[FIG 8]
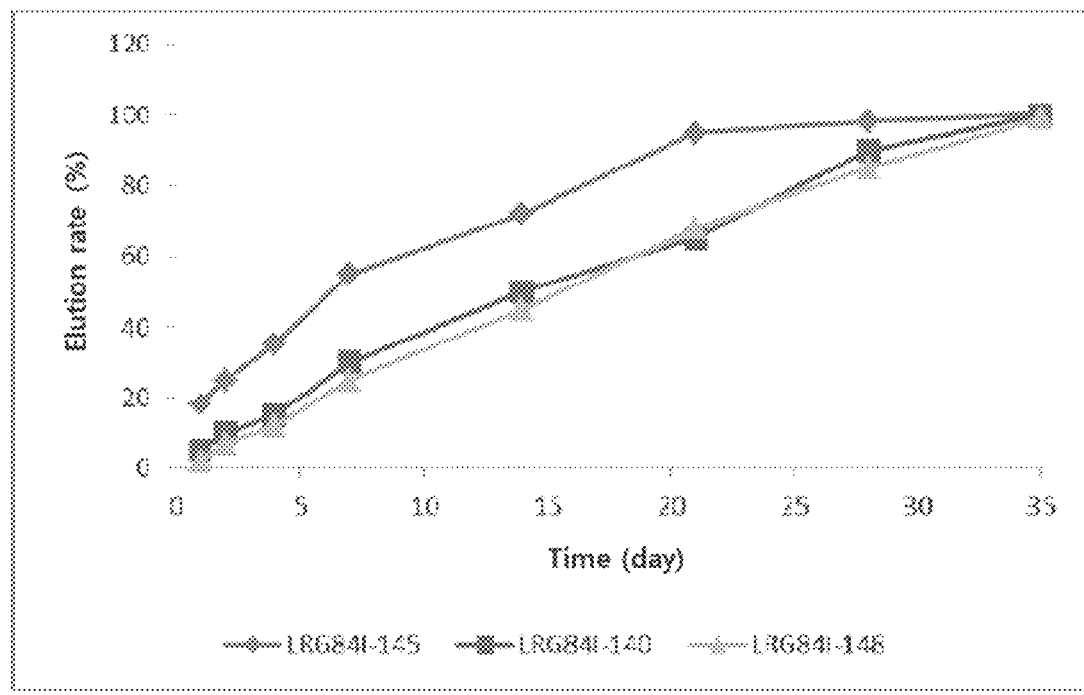

[FIG 9]
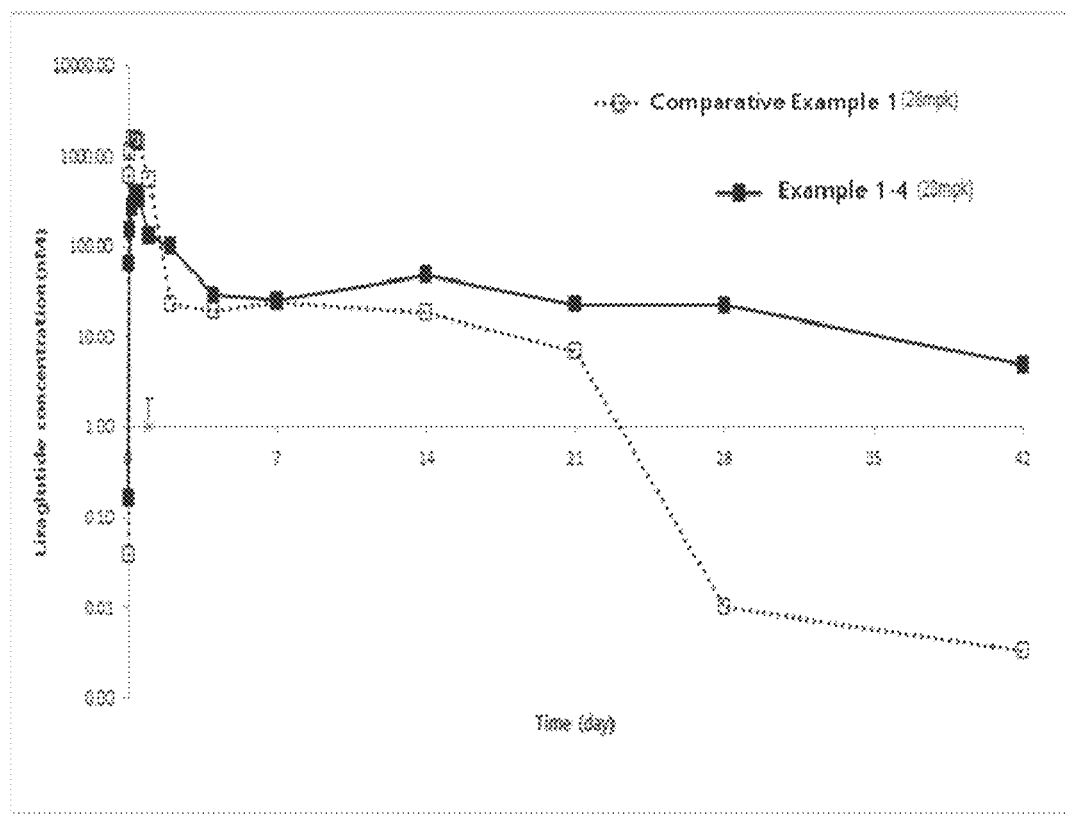

INITIAL BURST RELEASE CONTROLLED DEPOT COMPOSITION AND A METHOD THEREOF

CROSS-REFERENCE TO RELATED APPLICATIONS

This application is a Section 371 of International Application No. PCT/KR2021/014179, filed Oct. 14, 2021, which has not yet published, which claims priority under 35 U.S.C. § 119(b) to Korean Application No. 10-2021-0013387, filed Jan. 29, 2021 and Korean Application No. 10-2021-0117287, filed Sep. 3, 2021, the disclosure of each of which is incorporated herein by reference in its entirety.

BACKGROUND

1. Field of the Invention

The present invention relates to a depot composition, in particular, by including a hydrophobic amino acid in a microsphere, it controls the initial burst release and provide high user convenience through good resuspension properties.

The present invention relates to technology development of a patient-customized drug release control (long-acting injection technology) improved pharmaceutical products for the entry into the Middle East and ASEAN markets (task number: 20014981) of the bio-industrial technology development-customized diagnostic treatment product business, which was carried out with the support of the Korea Evaluation Institute of Industrial Technology with the funding of the Ministry of Trade, Industry and Energy.

2. Discussion of Related Art

Depots are one of injection formulations that allow long-lasting drug efficacy, and are formulations that can be mainly used when long-term administration of hormones and the like is desired. A depot formulation, which is a sustained-release formulation, has the advantage that the number of injections to a patient can be minimized, but it is not easy to achieve constant, sustained-release of a drug over the entire release period after injection. In particular, when the initial burst release in which the drug in the depot is released in excess at the beginning of the infusion is high, side effects caused by the excessive drug release may occur, and the sustained effect of the drug efficacy may deteriorate for a specified period of time, and it is very important to control the initial burst release of the depot.

GLP-1 agonists such as liraglutide and semaglutide are drugs used for the treatment of diabetes and obesity by first being developed to lower blood glucose in diabetic patients and confirming that such drugs are effective in reducing body weight of obese patients. An analogue of an incretin hormone secreted in the intestines increases the amount of insulin secreted after meals and increases the time of excretion of gastrointestinal contents to allow the food to slowly fall from the stomach to the small intestine. In addition, various actions of acting on the central nervous system to inhibit appetite can help reduce blood glucose and reduce body weight.

However, when the body is exposed to an excessive amount of liraglutide, side effects such as nausea, diarrhea, increased heart rate, hypoglycemia, or a headache may appear, and control of initial burst release of a depot including liraglutide as an active ingredient is one of the more important problems.

Meanwhile, Japanese Patent No. 5681626 discloses that a sustained-release preparation including a phospholipid component and a microsphere in which a lipid component including a sterol and a polylactide-co-glycolide (PLGA) polymer are bound can control the release rate. However, in the case of a lipid, it does not exhibit a sufficient effect to inhibit the initial burst release, and there is a disadvantage that the properties of the microspheres are poor due to their strong hydrophobic nature. In addition, since the modification of polylactide-co-glycolide (PLGA) polymers forming microspheres leads to difficulties in approval in the use of drugs, there is a limit to practical use by applying the composition to a depot, as this.

In addition, in the case of a depot, the microspheres may be stored in a freeze-dried state and suspended in water for injection in consideration of the storage safety of the drug. In this case, when the suspension of the microspheres is poor, it is possible to administer less than one dose of the prescribed drug, and thus it is difficult to see a sufficient effect of the drug. In addition, low suspending ability may lead to formation of lumps and sedimentation of the microspheres, which can be difficult to inject due to the phenomenon of clogging of the injection needle during injection, and the suspending ability of the microsphere is also one of very important factors.

As such, since conventional sustained-release microspheres have limitations in providing a depot with a sufficiently controlled initial burst release, there is still a need to develop a depot composition with appropriate resuspension and initial burst release controlling properties.

RELATED ART DOCUMENTS

Patent Literature

1. Patent Literature 1: Japanese Patent No. 5681626

SUMMARY OF THE INVENTION

The present invention aims to solve the above problems, and an object of the present invention is to provide a depot composition having excellent resuspendability and inhibited excessive initial burst release of a drug, and a method of preparing the same.

The inventors of the present invention have tried to develop a depot composition capable of controlling an excessive initial burst release of a drug, and as a result, have found that the inclusion of a hydrophobic amino acid as a release-controlling substance in the oil layer and the water phase layer of the microspheres can inhibit the initial burst release of the drug. In addition, it was confirmed that the microspheres including the hydrophobic amino acid have uniform properties, excellent suspending ability, and excellent preparation characteristics as a depot, and the present invention was completed.

The present invention provides a depot composition including microspheres including an oil layer (O layer) including a biodegradable polymer and a hydrophobic amino acid.

The microspheres may further include a hydrophobic amino acid in the water phase layer.

The microspheres may have a bulk density (BD) of at least 0.1 g/ml and a zeta potential between −8 mV and −30 mV.

The hydrophobic amino acid may be selected from the group consisting of valine, methionine, alanine, phenylalanine, tryptophan, isoleucine and leucine.

The microspheres may include less than 1.5 parts by weight of the hydrophobic amino acid in an oil phase solution, based on 100 parts by weight of the biodegradable polymer.

The microspheres may be a microspheres prepared by including 0.05% (w/v) to 25% (w) of the hydrophobic amino acid, based on the entire water phase solution.

The biodegradable polymer may be a polymer including lactide and glycolide as monomers.

The biodegradable polymer may have an inherent viscosity of 0.35 dL/g to 0.65 dL/g.

In addition, the present invention also provides a method of preparing a depot composition including preparing an oil phase (O) solution including a hydrophobic amino acid and a biodegradable polymer or mixing the oil phase (O) solution with a first water phase (water phase 1: W1) solution including a water-soluble solvent to prepare a W1/O emulsion; and introducing the oil phase solution or W1/O emulsion into a second water phase (water phase 2: W2) to prepare an O/W2 emulsion or a W/O/W2 emulsion.

The second water phase (W2) solution may further include a hydrophobic amino acid.

The hydrophobic amino acid may be included in the oil phase solution in an amount of less than 1.5 parts by weight, based on 100 parts by weight of the biodegradable polymer.

The hydrophobic amino acid may be included in an amount of 0.05% (w/v) to 25.0% (w) based on the entire second water phase solution.

The method further includes the step of centrifuging to recover microspheres after drying and/or filtering the O/W2 emulsion or W1/O/W2 emulsion prepared above.

The microspheres of the depot composition of the present invention including the hydrophobic amino acid can control the excessive release of the active ingredient included in the microspheres at the beginning of the depot injection, can have excellent suspending ability, and can uniformly and continuously obtain the effect of the active ingredient even when a user is administered by injection.

BRIEF DESCRIPTION OF THE DRAWINGS

FIGS. 1A to 1G show SEM photographs of PLGA microspheres prepared according to an embodiment of the present invention. Specifically, FIGS. 1A to 1E show the case of using liraglutide as API, wherein FIG. 1A shows microspheres including no hydrophobic amino acid; FIG. 1B shows a microsphere including a hydrophobic amino acid in a first water phase layer; FIG. 1C shows microspheres including a hydrophobic amino acid in a second water phase layer; FIG. 1D shows microspheres including hydrophobic amino acid in an oil layer, and FIG. 1E shows microspheres including hydrophobic amino acid in the oil layer and the second water phase. In addition, FIGS. 1F to 1G show the case using semaglutide as API, wherein FIG. 1F shows a microsphere including no hydrophobic amino acid; and FIG. 1G shows the microsphere including a hydrophobic amino acid in the oil layer and the second water phase layer.

FIGS. 2A to 2E show SEM photographs of PLGA microspheres prepared in accordance with an embodiment of the present invention, wherein FIG. 2a shows microspheres including valine; FIG. 2B shows microspheres including methionine; FIG. 2C shows microspheres including phenylalanine; FIG. 2D shows microspheres including tryptophan; and FIG. 2E shows microspheres including leucine.

FIGS. 3A and 3B shows SEM photographs of PLGA microspheres made according to an embodiment of the present invention, wherein FIG. 3A shows a microsphere including no hydrophobic amino acid; and FIG. 3B shows a microsphere that does not include a hydrophilic amino acid and is coated with leucine.

FIGS. 4A and 4B show SEM photographs of PLGA microspheres prepared according to an embodiment of the present invention, wherein FIG. 4A shows microspheres including cholesterol; and FIG. 4B shows microspheres including dioleoyl-3-trimethylammonium propane (DOTAP), which is a cationic lipid.

FIGS. 5A to 5C show SEM photographs of PLGA microspheres including leucine in an oil layer prepared according to an embodiment of the present invention.

FIGS. 6A to 6D show SEM photographs of PLGA microspheres including leucine in the oil layer and a second water phase layer made according to an embodiment of the present invention.

FIG. 7 is a graph showing the results of DSC analysis of microspheres prepared according to an embodiment of the present invention.

FIG. 8 is a graph showing the long-term release characteristics of microspheres prepared according to an embodiment of the present invention.

FIG. 9 is a graph showing the results of identifying the in vivo drug release behavior of microspheres prepared according to an embodiment of the present invention.

DETAILED DESCRIPTION OF EXEMPLARY EMBODIMENTS

Hereinafter, the present invention will be described in detail.

It is to be understood, however, that the present invention may assume various modifications and alternative forms, and that the specific examples and descriptions set forth below are intended merely to aid the understanding of the present invention and are not intended to limit the present invention to the particular disclosed forms. It is to be understood that the scope of the present invention includes all modifications, equivalents, and alternatives falling within the spirit and scope of the present invention.

The present invention provides a depot composition including microspheres including an oil layer (O layer) including a biodegradable polymer and a hydrophobic amino acid.

The depot composition of the present invention corresponds to a sustained-release preparation as a formulation capable of releasing a drug for a long period of time, and more specifically, may be a sustained-release injection preparation. Sustained-release preparations should slowly release the drug therein at the intended level for a period of time. To this end, it is necessary to control the initial burst release in which the internal drug is released in excess at the beginning of the injection of the depot, and to make a good suspension before injection. The present invention has produced microspheres having excellent suspending ability while controlling the initial burst release through mixing of a hydrophobic amino acid to complete a depot composition.

The microspheres of the present invention may be in the form of an O/W including a single water phase layer (W layer) and a single oil layer (O layer). In addition, the microspheres of the present invention may be in the form of W/O/W including a water phase layer (W layer), an oil layer (O layer) and a water phase layer (W layer).

For convenience of description of the two or more water phase layer or water phase solutions, mention may be made here of the water phase layer present inside the oil layer of the microspheres or a water phase solution for forming the same being the first water phase (W1 layer) or the first water phase solution, respectively, and of the water phase layer formed outside the oil phase of the microsphere or a water phase solutions for forming the same being the second water phase (W2) layer or the second water phase, respectively. In this case, a water phase layer (W layer) or water phase solution in an O/W type of microsphere is understood to be a configuration corresponding to a second water phase (W2 layer), or a second water phase solution in a W1/O/W2 type of microsphere. Thus, the O/W emulsion may also be referred to herein as an O/W2 emulsion, and in the following description, reference to the second water phase layer (W2 layer), or the second water phase solution, is to be understood as a description corresponding to the water phase layer or water phase solution for an O/W type of microsphere.

The microspheres can be prepared by a single emulsification method in which an oil phase solution including a biodegradable polymer and a hydrophobic amino acid is added to a water phase solution and emulsified to form an O/W emulsion. It can also be prepared by a double emulsification method in which the W/O emulsion is added to the water phase solution and re-emulsified to make the W/O/W emulsion.

Specifically, the microspheres of the present invention are prepared by the method including: dissolving a hydrophobic amino acid and a biodegradable polymer in a fat-soluble solvent to prepare an oil phase (O) solution; or by mixing a first water phase (water phase 1: W1) solution prepared by dissolving an active ingredient in a water-soluble solvent, and an oil phase (O) solution prepared by dissolving the hydrophobic amino acid and the biodegradable polymer in an fat-soluble solvent, to prepare a W1/O emulsion; and adding the oil phase solution or the W1/O emulsion to a second water phase (water phase 2: W2) including a water phase solvent.

The fat-soluble solvent of the present invention is commonly used in the art, and any pharmaceutically acceptable carrier or solvent may be used. One example may be, but is not limited to, dichloromethane.

The water-soluble solvents in the present invention are commonly used in the art, and any pharmaceutically acceptable carrier or solvent may be used. Examples include, but are not limited to, polyvinyl alcohol (PVA) or sodium acetate. The second water phase solution may further include an osmotic pressure regulator, such as sodium chloride, for regulating the osmotic pressure of the solution during emulsion preparation.

The microspheres of the present invention may further include a hydrophobic amino acid in the water phase layer. The water phase layer may be a second water phase layer. Specifically, the microspheres can be prepared by adding the oil phase solution or the W1/O emulsion to a water phase solution prepared by dissolving a hydrophobic amino acid in the water phase solvent.

In the present invention, when both the oil layer and the water phase layer of the microspheres include a hydrophobic amino acid, the suspending ability of the depot composition is significantly improved in addition to the initial burst release-inhibiting effect of inhibiting the excessive release of the active ingredient inside the microspheres, and thus the composition can be effectively used as an injectable agent.

The microspheres of the invention may have a bulk density (BD) value of 0.1 g/ml or more.

The bulk density (BD) refers to the density based on a volume including interparticle voids when a powder or granular material is filled into a specific vessel. When the bulk density of the microspheres in the depot composition is less than 0.1 g/ml, the microspheres are too light to be used as an injectable agent. In particular, due to the bulky nature of the microspheres, there is a problem of poor dispersion in water for injection during resuspension. The microspheres of the present invention have a bulk density of 0.1 g/ml or more, have excellent in resuspension performance and have excellent properties as an injectable agent.

The microspheres of the present invention may have a zeta-potential value of −8 mV or less.

The zeta-potential is expressed in units of the magnitude of the attractive force and the repulsive force between particles, and the microspheres of the present invention may have a zeta-potential of −8 mV or less. When the zeta-potential value is greater than −8 mV, the microspheres of interest may have reduced dispersibility and settle rapidly in water for injection.

Preferably, it has a zeta-potential value of −8 mV to −40 mV, or −10 mV to −30 mV. When the above range is satisfied, the microspheres are excellent in dispersibility, so that the microspheres can be well suspended in water for injection, and in this case, a uniform depot suspension can be formed, thereby providing excellent characteristics, particularly, as an injection preparation.

The microspheres of the present invention further include an active ingredient. That is, since the depot composition of the present invention serves to be administered into the body to release the active ingredient into the body for a certain period of time, the active ingredient may be included in the interior of the depot composition. The active ingredient may be included in the microspheres and receive protection from the microspheres and remain in the body for a certain period of time.

The active ingredient may be included in the first water phase layer (W1 layer) or the oil layer (O layer) of the microspheres of the present invention. Typically in the case of a single emulsion, the active ingredient may be included in the oil layer, and in the case of a double emulsion, it may be included in the first water phase layer.

The active ingredient used for release purposes in the present invention may be preferably a drug for treating a specific disease or symptom, more preferably a biopharmaceutical or a peptide drug. The specific drug may be liraglutide or semaglutide.

The liraglutide or semaglutide may be used for the treatment of obesity or diabetes as a GLP-1 agonist involved in the action of glucagon-like peptide-1 (GLP-1), a hormone that plays a role in lowering blood glucose. When the body is exposed to an excessive amount of liraglutide or semaglutide, symptoms such as emesis, nausea, hypoglycemia, a headache and the like may appear.

Therefore, when liraglutide or semaglutide is included as an active ingredient of the depot composition, it is very important that the active ingredient is not released in excess from the depot. In addition, since liraglutide or semaglutide is a peptide drug and it is difficult to maintain or store, there is a method in which the depot composition is dried and stored in a powder form to solve the problem. In this case, the powder should be suspended in water for injection for injection, and when the suspending ability of the powder is poor, a uniform preparation cannot be formed. Therefore, the uniformity of the efficacy is lowered, agglomeration and sedimentation of the microspheres occur, or floating microspheres can be generated, and thus it may be difficult to secure the controlled release effect. Therefore, in the case of including liraglutide or semaglutide as an active ingredient, it is very important to inhibit the initial burst release and to implement a preparation excellent in suspending ability.

In order to provide a depot composition having such an initial burst release-controlling ability, the oil layer (O layer) of the microspheres contains a biodegradable polymer and a hydrophobic amino acid.

Among amino acids, the hydrophobic amino acid does not have a polar portion, and is selected from the group consisting of valine, methionine, alanine, phenylalanine, tryptophan, isoleucine and leucine. Preferably, it may be leucine. When a hydrophobic amino acid is included in the oil layer of the microspheres of the present invention, it is possible to control the initial burst release by reducing the pores of the microsphere surface by the hydrophobic amino acid and by partially inhibiting the some of the active ingredient present in the first water phase layer or oil layer from coming out of the oil phase layer because the hydrophobic amino acid present in the O layer is not friendly with water.

When the hydrophobic amino acid is included only in the first water phase layer, the initial burst release of an excessive amount of the active ingredient is not effectively inhibited, and when it is included only in the second water phases layer, there is a problem in that the dissolution time is increased due to the use of an excessive amount of a raw material (hydrophobic amino acid) and the manufacturing process and process costs increase due to the increase in raw material costs. On the other hand, when it is included in an oil layer or in both of the oil layer and the second water phase layer, it has the advantage that an effective initial burst release-controlling effect can be obtained even if it contains only a low content of hydrophobic amino acid, and the suspending ability of the depot can be significantly improved.

The microspheres may include less than 1.5 parts by weight of the hydrophobic amino acid in an oil phase solution, based on 100 parts by weight of the biodegradable polymer. When the hydrophobic amino acid is mixed in an amount of 1.5 parts by weight or more, there is a problem in that the uniformity of the depot drug is lowered due to nonuniformity of the surface of the microspheres.

More specifically, the microspheres may include more than 0.07 to 1.1 parts by weight, or 0.3 to 1.1 parts by weight of the hydrophobic amino acid in an oil phase solution, based on 100 parts by weight of the biodegradable polymer. In this case, the microspheres have an excellent initial burst release-inhibiting effect on the active ingredient.

In this aspect, the microspheres of the present invention may include less than 1.5 parts by weight; more than 0.07 to 1.1 parts by weight; or 0.3 to 1.1 part by weight of the hydrophobic amino acid in the oil layer, based on 100 parts by weight of the biodegradable polymer. When the hydrophobic amino acid is included in the oil layer in an amount of 1.5 parts by weight or more, based on 100 parts by weight of the polymer, there is a problem that the surface of the microspheres becomes non-uniform, and the uniformity of the depot drug is lowered. In addition, in the case where only the hydrophobic amino acid is included in the oil layer alone, the initial burst release-controlling effect is slight due to the hydrophilic amino acid when the hydrophobic amino acid is included in an amount of 0.07 parts by weight or less.

In addition, the microspheres of the present invention may be those prepared including 0.05% (w/v) to 25% (w) of hydrophobic amino acid with respect to the entire water phase solution including the water-soluble solvent and the hydrophobic amino acid. In the water phase layer, when the hydrophobic amino acid is included at 0.005% (w/v) or less, the bulk density of the microspheres becomes too low, which is not suitable for use as an injectable agent.

The biodegradable polymer has a property of being degraded in vivo and forming a microsphere in the present invention, and as the polymer is gradually degraded in vivo, a drug included therein can be gradually released. That is, it serves to protect the drug inside during the drug release period and control the drug release for a long period of time.

A biodegradable polymer specifically approved for use in injectable preparations by the Ministry of Drug Safety of each country may be used without limitation in the present invention.

The biodegradable polymer may have an intrinsic viscosity of 0.35 to 0.65 dL/g, preferably 0.50 to 0.55 dL/g. When the intrinsic viscosity is less than 0.35 dL/g, it may exhibit a drug release that is faster than a desired period of time, and when it is greater than 0.65 dL/g, it exhibit a drug release that is slower than a desired period of time, so it may be difficult to achieve a sufficient drug effect. In one preferred embodiment, a 0.53 dL/g viscosity polymer is used to maintain drug release properties for a long period of time as a depot composition for optimal maintenance of drug persistence, making it bioavailable. The inherent viscosity can be measured according to the method of measuring the viscosity of poly(lactide-co-glycolide) (PLGA) provided by the manufacturer.

Specifically, the biodegradable polymer may be a polymer including lactide and glycolide as monomers. All of the above polymers are included in the present invention, regardless of the polymerized form, when the lactide and the glycolide are included as monomers. It is also meant to include branched-polymers in which the end of the polymer is modified. Examples of such polymers may be selected from, but are not limited to, the group consisting of polylactide (PLA), polyglycolide (PGA), poly(lactide-co-glycolide (PLGA), and Glucose-PLGA. In this aspect, the microspheres of the present invention may be referred to as PLGA microspheres.

The biodegradable polymer may have the following molecular weight distribution for respective molecular weights as determined by gel filtration chromatography analysis: The molecular weight range of 500 to 4,000 is 3% or more, the molecular weight range of 5,000 to 16,000 is 10% or more and less than 30%, and the molecular weight range of 16,000 to 40,000 is 20% or more and less than 50%, and the molecular weight range of 40,000 or more is 20% or more.

The depot composition of the present invention may further include a pharmaceutically acceptable carrier or excipient, etc. Preferably, however, the depot composition of the present invention may not include stabilizers, pH modifiers, and oxidizing agents.

In addition, the present invention also provides a method of preparing a depot composition including preparing an oil phase (O) solution including a hydrophobic amino acid and a biodegradable polymer or mixing the oil phase (O) solution with a first water phase (water phase 1: W1) solution including water-soluble solvent to prepare a W1/O emulsion; and introducing the oil phase solution or W1/O emulsion into a second water phase (water phase 2: W2) to prepare an O/W2 emulsion or a W/O/W2 emulsion.

It may also further include the step of centrifuging the prepared emulsion after drying and/or filtration to recover the microspheres.

The first water phase (water phase 1: W1) solution can be prepared by dissolving the active ingredient in a water-soluble solvent. The water-soluble solvents in the present invention are commonly used in the art, and any pharmaceutically acceptable carrier or solvent may be used. Examples include, but are not limited to, polyvinyl alcohol (PVA) or sodium acetate.

The active ingredient refers to a drug included for the purpose of being released from the depot composition of the present invention, and is not limited in type, and can be used in the present invention. Specifically, it may be a water-soluble drug, and may be a biopharmaceutical or a peptide drug. One example may be liraglutide or semaglutide.

The oil phase (O) solution can be prepared by mixing and dissolving a biodegradable polymer and a hydrophobic amino acid in a fat-soluble solvent. The active ingredient can also be mixed and dissolved in the oil phase solution. In particular, in the case of microspheres produced by a single emulsification method, an emulsion can be produced while adding an oil phase solution in which the active ingredient is mixed to a water phase solution.

As the solvent for including the active ingredient in the oil phase solution, a solvent commonly used in the technical field of the present invention can be used.

The fat-soluble solvent of the present invention is commonly used in the art, and any pharmaceutically acceptable carrier or solvent may be used. One example may be, but is not limited to, dichloromethane.

The hydrophobic amino acid may be included in the oil phase solution in an amount of less than 1.5 parts by weight, based on 100 parts by weight of the biodegradable polymer. When the hydrophobic amino acid is included in the oil phase solution in an amount of 1.5 parts by weight or more, there is a problem that the surface of the microspheres becomes non-uniform, and the uniformity of the depot drug is lowered. In addition, when only the hydrophobic amino acid is included in the oil solution alone, the initial burst release-controlling effect by the hydrophilic amino acid is insignificant when the content is less than 0.07 parts by weight.

The O/W emulsion can be prepared by mixing the oil phase into a water phase and stirring with a homogenizer. The stirring rate and time may be used depending on the emulsion formation conditions and the amount of sample.

The second water phase (W2) solution may be prepared by including a water-soluble solvent.

The water-soluble solvents in the present invention are commonly used in the art, and any pharmaceutically acceptable carrier or solvent may be used. Examples include, but are not limited to, polyvinyl alcohol (PVA) or sodium acetate. The second water phase solution may further include an osmotic pressure regulator, such as sodium chloride, for regulating the osmotic pressure of the solution during emulsion preparation.

In addition, the water-soluble solvent may further include polyvinyl alcohol, methylcellulose, polyvinylpyrrolidone, carboxymethylcellulose, lecithin, gelatin, polyoxyethylene, oxyethylene sorbitan fatty acid esters, polyoxyethylene castor oil derivatives, and mixtures thereof.

In addition, the hydrophobic amino acid may be included in an amount of 0.05% (w/v) to 25.0% (w) based on the entire second water phase solution. When the second water phase solution contains 0.005% (w/v) or less of hydrophobic amino acid, the bulk density of the microspheres becomes too low, which is not suitable for use as an injectable agent.

The present invention also provides a depot composition including the microspheres prepared by the method described above. In this case, it is possible to obtain a depot composition having excellent suspending ability while having excellent initial burst release-inhibiting effect on the active ingredient in the microspheres.

Hereinafter, the present invention will be described in detail by way of Preparation Examples and Experimental Examples. The following Examples and Experimental Examples merely illustrate the present invention and do not limit the scope of the present invention.

Preparation Example: Preparation of Test and Preparation of Microspheres

Preparation Example 1-1: Preparation of Microspheres

A first water phase (water phase 1: W1) solution was prepared by dissolving 252 mg of liraglutide (Polypeptide Laboratories) or semaglutide as an API in 1.2 mL of 1 wt % sodium acetate (Daejung Chemicals & Metals Co. Ltd.) solution.

An oil phase (O) solution was prepared by dissolving 1350 mg of a DL-lactic acid-glycolic acid copolymer (Poly D,L-lactic-co-glycolide; Resomer select 5545 DLG 5Glu, Evonik; inherent viscosity 0.53 dl/g) in 5 mL of dichloromethane (Dichloromethane, Honeywell). A W1/O emulsion was prepared by mixing the W1 and O solutions and stirring with a homogenizer at 9000 rpm for 2 minutes.

Next, a second water phase (Water phase 2:W2) solution was prepared by dissolving 0.5 g of sodium chloride (NaCl; Daejung Chemicals & Metals Co. Ltd) in 100 mL of a 1 wt % polyvinyl alcohol (PVA; Gohsenol EG-40P, Nippon Gohsei) solution. A W1/O/W2 emulsion was prepared by stirring with a homogenizer at 9000 rpm while injecting a W1/O emulsion into the W2 phase solution at a rate of 5 ml/min. The prepared W1/O/W2 emulsion was dried in water at room temperature for 3 hours, filtered through a sieve having a mesh size of 75 um, and then centrifuged to recover the microspheres. The recovered microspheres were redispersed in distilled water and then centrifuged three times to wash the surfaces of the microspheres. After washing, the microspheres were lyophilized to finally obtain microspheres including a drug encapsulated therein.

The microspheres prepared by this method were used as a control of the microspheres of the present invention in the following experiments.

Preparation Example 1-2: Preparation of Microspheres Including Hydrophobic Amino Acid For control of initial burst release in long-acting formulations, microspheres including a hydrophobic amino acid were prepared to confirm their release-controlling effect. Valine, methionine, phenylalanine, tryptophan or leucine were used as a hydrophobic amino acid.

A specific preparation method was the same as the method of Preparation Example 1, except that a hydrophobic amino acid was mixed in the first water phase (water phase 1: W1) solution, the oil phase (O) solution, and/or the second water phase (water phase 2: W2).

When the hydrophobic amino acid was mixed in the first water phase (water phase 1: W1) solution or the oil phase (O) solution, it was mixed with the main component (liraglutide or semaglutide) in a molar ratio of 1:1, and when the hydrophobic amino acid was mixed in the second water phase (water phase 2: W2), it was mixed with sodium chloride (NaCl) at the same concentration. The specific preparation formulation was varied according to each experiment.

Testing Methods

1. Evaluation of Liraglutide or Semaglutide Content 20 mg of microspheres were placed in a 20 mL volume flask, dissolved with 10 mL of acetonitrile, adjusted to a gauge mark with a 1 wt % sodium acetate solution, filtered with a 0.45 syringe filter, and the amount of liraglutide or semaglutide was quantified by high performance liquid chromatography. At this time, the analysis conditions were measured at a flow rate of 1.0 mL/min at 215 nm using an Aegispak C18-L column using a solvent mixed with 0.05 M potassium phosphate monobasic and acetonitrile at 53:47 as a mobile phase.

2. Release Testing 20 mg of lyophilized microspheres were subjected to release testing in a DISTEK Dissolution system 2500 at 120 rpm and 37° C. using 100 mL of phosphate buffer (1×PBS) including 0.05% Polysorbate 80. A 2 mL sample was taken and centrifuged to separate the supernatant and the microspheres, and the amount of liraglutide or semaglutide present in the supernatant were quantified by high performance liquid chromatography. At this time, the analysis conditions were measured at a flow rate of 1.0 mL/min and 215 nm using an Aegispak C18-L column using a solvent mixed with 0.05 M potassium phosphate monobasic and acetonitrile at 53:47 as a mobile phase.

The initial burst release of the drug from the microspheres confirmed the amount of liraglutide eluted for 1 hour in the method described above, and long-term release confirmed the amount of liraglutide eluted for 35 days.

3. SEM Measurement

About 10 mg of the microspheres were fixed on an aluminum stub and coated with platinum for 3 minutes under a vacuum of 0.1 Torr and a high voltage (10 kV), then mounted on an SEM powder and the surface of the microsphere was observed using an image analysis program.

4. Particle Size Measurement

The size of the microspheres was measured using Mastersizer from Malvern. About 30 mg of the microspheres were suspended in 5 ml of distilled water, and the suspension was put in a dispersing apparatus, and then dispersed for 1 minute under conditions of 2800 rpm and Ultrasound 50% to measure the size.

5. Suspension Density Measurement

When the microspheres of the present invention were resuspended in an injection solvent, the density of the suspension was confirmed to be well dispersed. The density of the suspension was measured using D5 from Mettler Toledo. 534 mg of the microspheres were suspended in 2 ml of the solvent portion and injected into the cell in the instrument to measure the density.

The reference value of the suspension density was determined on the basis of a suspension density of 1.01 g/cm$^3$ of the untreated microspheres.

6. Zeta-Potential Measurement

After 50 mg of the microspheres were dispersed in 3 ml of purified water, the zeta-potential was measured using a Nano-ZS instrument from Malvern.

7. Bulk Density Measurement

An Eppendorf tube was filled with 1 ml of microspheres and the mass of the filled microspheres was measured.

8. DSC Measurement

DSC measurements were performed using a differential scanning calorimeter. 5 to 10 mg of each microsphere was placed in an aluminum sample pan and measured from 25° C. to 250° C. at 5° C./min.

Test Example 1: Confirmation of Initial Burst Release-Controlling Effect by Mixing Hydrophobic Amino Acid An experiment was conducted to determine whether a hydrophobic amino acid in microspheres could control the excessive release of a drug. According to the same method as the method for preparing microspheres of Preparation Example 1, microspheres including a hydrophobic amino acid were produced by mixing leucine as a hydrophobic amino acid in each of the first water phase (water phase 1: W1) solution, the oil phase (O) solution, and/or the second water phase (water phase 2: W2) at each stage of the preparation of microspheres, and preparing an emulsion. The specific preparation conditions were the same as those for the preparation of the microspheres of Preparation Example 1, except that the hydrophobic amino acid were mixed in each solution.

When the hydrophobic amino acid was mixed in the first water phase (water phase 1: W1) solution or the oil phase (O) solution, it was mixed with the main component (liraglutide or semaglutide) in a molar ratio of 1:1, and when the hydrophobic amino acid was mixed in the second water phase (water phase 2: W2), it was mixed with sodium chloride (NaCl) at the same concentration. The specific preparation formulation of the microspheres is as shown in Table 1.

TABLE 1

| Classification | Batch No. | W1 Phase (mg) | | O Phase (mg) | | W2 Phase (%(w/v)) | |
| --- | --- | --- | --- | --- | --- | --- | --- |
| | | API | Amino Acid | PLGA | Amino Acid | NaCl | Amino Acid |
| Comparative Example 1 | 111 | 252 | — | 1350 | — | 0.5 | — |

TABLE 1-continued

| | | W1 Phase (mg) | | O Phase (mg) | | W2 Phase (%(w/v)) | |
|---|---|---|---|---|---|---|---|
| Classification | Batch No. | API | Amino Acid | PLGA | Amino Acid | NaCl | Amino Acid |
| Comparative Example S-1 | SMG21-008 | 252 | — | 1350 | — | 0.5 | — |
| Example 1-1 | 114 | 252 | 9 (Leucine) | 1350 | — | 0.5 | — |
| Example 1-2 | 134 | 252 | — | 1350 | — | 0.5 | 0.5 |
| Example 1-3 | 139 | 252 | — | 1350 | 9 (0.67%*) | 0.5 | — |
| Example 1-4 | 137 | 252 | — | 1350 | 9 (0.67%*) | 0.5 | 0.5 |
| Example S-1 | SMG21-009 | 252 | — | 1350 | 8.8 (0.65%*) | 0.5 | 0.5 |

*Content of release-controlling component compared to polymer (units: % (w/w))

In order to confirm the initial burst release-inhibiting effect in the microspheres including no hydrophobic amino acid (Comparative Example 1), the microspheres in which leucine is mixed in the first water phase solution (Example 1-1), the microspheres in which leucine is mixed in the second water phase solution (Example 1-2), the microspheres prepared by mixing leucine in the oil phase solution (Example 1-3), and the microspheres obtained by mixing leucine simultaneously with the oil phase solution and the second water phase solution (Example 1-4) according to Table 1, the content and the release rate of liraglutide (API) were determined according to the conditions of Testing Methods 1 and 2, and the surface of the microspheres using SEM photographs was observed in accordance with the conditions in Testing Methods 3 and 4, and the average particle size (D[4,3]) of each microsphere was measured. The results are shown in Table 2 below and FIGS. 1A to 1E.

Further, in order to confirm the initial burst release-inhibiting effect in the microspheres including no hydrophobic amino acid (Comparative Example S-1) and the microspheres in which leucine was simultaneously mixed in the oil phase solution and the second water phase solution (Example S-1) by applying semaglutide, the content and the release rate of the semaglutide (API) were confirmed according to the conditions of Testing Methods 1 and 2, and the surface of the microspheres using SEM photographs was observed according to conditions of Testing Methods 3 and 4, and the average particle size (D[4,3]) of each microsphere was measured. The results are shown in the following Table 2 and FIGS. 1F to 1G.

TABLE 2

| Classification | Batch No. | Content (%) | Release (1 h) (%) | D[4,3] (μm) | SEM Properties |
|---|---|---|---|---|---|
| Comparative Example 1 | 111 | 100.51 | 15.76 | 42.29 | Many Pores |
| Comparative Example S-1 | SMG2I-008 | 101.54 | 11.88 | 61.61 | Many Pores |
| Example 1-1 | 114 | 102.90 | 16.21 | 40.77 | Many Pores |
| Example 1-2 | 134 | 105.21 | 1.61 | 35.65 | No Pores |
| Example 1-3 | 139 | 104.45 | 2.91 | 27.32 | No Pores |
| Example 1-4 | 137 | 106.94 | 3.14 | 39.60 | No Pores |
| Example S-1 | SMG2I-009 | 99.44 | 5.45 | 51.54 | No Pores |

As shown in Table 2 and FIGS. 1A to 1G, it can be confirmed that many pores are present on the surfaces of the microspheres of Comparative Example 1 and Comparative Example S-1, and thus the initial burst release of API is also large. In addition, even in the case of the microsphere including leucine in the first water phase layer (Example 1-1), the effect of covering the pores was not obtained, and thus the initial burst release-inhibiting effect could not be obtained.

However, it can be seen that when leucine is included in the oil layer (O) and/or the second water phase layer (W2), the pores of the microspheres are covered and the pores on the surface are hardly observed. Specifically, in the case where leucine is included only in the oil layer (Example 1-3), the properties of the microspheres themselves were somewhat poor, but in the cases where leucine was included in both an oil layer and a second water phase layer (Comparative Examples 1-4 and S-1), it was confirmed that the properties were also good while having the initial burst release-inhibiting effect of API.

Test Example 2: Confirmation of Initial Burst Release-Controlling Effect Depending on Hydrophobic Amino Acid Type In order to confirm whether a hydrophobic amino acid other than leucine can similarly inhibit the initial burst release of microspheres, the release of the API liraglutide was confirmed in microspheres prepared by mixing valine, methionine, phenylalanine, tryptophan and leucine in the microsphere preparation step, respectively.

While preparing the microspheres in the same manner as in the preparation of the microspheres of Comparative Example 1, the hydrophobic amino acid were mixed with the oil phase (O) solution and the second water phase (water phase 2: W2), respectively, during the stage of preparing the microspheres, to prepare the microspheres including the hydrophilic amino acids. The specific preparation conditions were the same as those for the preparation of the microspheres of Comparative Example 1, except that the hydrophobic amino acids were mixed in each solution.

In the oil phase (O) solution, each hydrophobic amino acid was mixed in a 1:1 molar ratio relative to the main component (liraglutide), and in the second water phase (water phase 2: W2), each hydrophobic amino acid was mixed with sodium chloride at the same concentration. The specific preparation formulation of the microspheres is as shown in Table 3 below.

TABLE 3

| Classification | Batch No. | W1 Phase (mg) API | O Phase (mg) PLGA | O Phase (mg) Amino Acid | W2 Phase (%(w/v)) NaCl | W2 Phase (%(w/v)) Amino Acid |
|---|---|---|---|---|---|---|
| Comparative Example 1 | 111 | 252 | 1350 | — | 0.5 | — |
| Example 2-1 | 130 | 252 | 1350 | 8 (Valine 0.59%*) | 0.5 | 0.5 (Valine) |
| Example 2-2 | 131 | 252 | 1350 | 10 (Methionine 0.74%*) | 0.5 | 0.5 (Methionine) |
| Example 2-3 | 132 | 252 | 1350 | 11 (Phenylalanine 0.81%*) | 0.5 | 0.5 (Phenylalanine) |
| Example 2-4 | 133 | 252 | 1350 | 14 (Tryptophan 1.04%*) | 0.5 | 0.5 (Tryptophan) |
| Example 2-5 | 137 | 252 | 1350 | 9 (Leucine 0.67%*) | 0.5 | 0.5 (Leucine) |

*Content of release-controlling component compared to polymer (units: % (w/w))

In order to confirm the initial burst release-inhibiting effect in the microspheres including no hydrophobic amino acid (Comparative Example 1), the microspheres including valine (Example 2-1), the microspheres including methionine (Example 2-2), the microspheres including phenylalanine (Example 2-3), the microspheres including tryptophan (Example 2-4) and the microspheres including leucine (Example 2-5) according to Table 3, the content and the release rate of liraglutide (API) were determined according to the conditions of Testing Methods 1 and 2, the surface of the microspheres using SEM photographs was observed according to Testing Methods 3 and 4, and the average particle size (D[4,3]) of each microsphere was measured and the results are shown in the following Table 4 and FIGS. 2A to 2E.

TABLE 4

| Classification | Batch No. | Content (%) | Release (1 h) (%) | D[4,3] (μm) |
|---|---|---|---|---|
| Comparative Example 1 | 111 | 100.51 | 15.76 | 42.29 |
| Example 2-1 | 130 | 110.19 | 2.21 | 37.94 |
| Example 2-2 | 131 | 108.10 | 2.72 | 32.92 |
| Example 2-3 | 132 | 108.40 | 3.53 | 37.53 |
| Example 2-4 | 133 | 106.39 | 1.81 | 35.47 |
| Example 2-5 | 137 | 106.94 | 3.14 | 39.60 |

As shown in Table 4 and FIGS. 2A to 2E, the pores were reduced for all microspheres (Examples 2-1 to 2-5) including valine, methionine, phenylalanine, tryptophan or leucine compared to the surface and API release amount of the microspheres of Comparative Example 1 (FIG. 1A), indicating that the initial burst release of API (liraglutide) was also inhibited. This means that when the microspheres are prepared such that a hydrophobic amino acid is included in the oil phase and the W2 phase, the hydrophobic amino acid can act to inhibit the release of the microspheres.

Test Example 3: Confirmation of Difference in Initial Burst Release-Inhibiting Effect with Coating of Microspheres In contrast to the case where the hydrophobic amino acid is included in the microspheres, it was confirmed whether the initial burst release could be inhibited even when the microspheres were coated with hydrophobic amino acids after their preparation.

Specifically, the preparation formulation was as shown in Table 5, and microspheres were prepared according to the conditions and method described in Preparation Example 1 (Comparative Example 2). The microspheres of Comparative Example 2 prepared above were resuspended in a leucine solution and then lyophilized (Comparative Example 3). Leucine solutions were prepared by mixing 0.5 g of leucine per 1 g of microspheres, maintaining the suspension for 10 minutes, and then performing lyophilization.

TABLE 5

| Classification | Batch No. | Microsphere Composition API | Microsphere Composition PLGA | Microsphere Composition W2 phase | Coating Solution |
|---|---|---|---|---|---|
| Comparative Example 2 | 100 | 520 mg | 2479 mg | NaCl 0.5% (w/w) 1% PVA | — |
| Comparative Example 3 | 100L | | | | Leucine 0.5% (w/w) |

Thus, in order to confirm the initial burst release-inhibiting effect on the microspheres of Comparative Example 2 and Comparative Example 3 prepared above, the content and release rate of liraglutide (API) were determined according to the conditions of Testing Methods 1 and 2, and the surface of the microspheres using SEM photographs was observed according to Testing Methods 3 and 4, and the average particle size (D[4,3]) of each microsphere was measured, and the results are shown in the following Table 6 and FIGS. 3A and 3B.

TABLE 6

| Classification | Batch No. | Content (%) | Release (1 h) (%) | D[4,3] (μm) |
|---|---|---|---|---|
| Comparative Example 2 | 100 | 92.82 | 20.17 | 31.90 |

TABLE 6-continued

| Classification | Batch No. | Content (%) | Release (1 h) (%) | D[4,3] (μm) |
|---|---|---|---|---|
| Comparative Example 3 | 100L | 90.14 | 24.73 | 29.44 |

As shown in Table 6 above and FIGS. 3A and 3B, it can be seen that when the microspheres were simply coated with a hydrophobic amino acid (Comparative Example 3), even when compared with the uncoated microspheres (Comparative Example 2), the release-inhibiting effect could not be obtained, but rather the release amount increased. Therefore, it can be seen that the release-inhibiting effect obtained in the microspheres including the hydrophobic amino acid of the present invention is a unique effect that hydrophobic amino acids can be obtained by controlling the pores and surfaces of the microspheres in the emulsion preparation step.

Test Example 4: Confirmation of Initial Burst Release-Controlling Effect According to Type of Other Hydrophobic Materials In order to confirm whether the initial burst release-inhibiting effect in the microspheres of the hydrophobic amino acid of the present invention can be obtained even in the case of using other materials, it was confirmed whether the initial burst release of the microspheres can be inhibited by using cholesterol which is one of the hydrophobic materials and DOTAP which is a cationic lipid.

While preparing the microspheres in the same manner as in the preparation of the microspheres of Comparative Example 1, cholesterol or DOTAP was mixed in the oil phase (O) during the stage of preparing the microparticles to prepare the microspheres including cholesterol or DOTAP.

In the oil phase (O) solution, cholesterol or DOTAP was mixed in a 1:1 molar ratio relative to the main component (liraglutide). The specific preparation formulation of the microspheres is shown in the following Table 7.

TABLE 7

| Classification | Batch No. | W1 Phase API | O Phase | | W2 Phase NaCl |
|---|---|---|---|---|---|
| | | | PLGA | Release-controlling substance | |
| Comparative Example 1 | 111 | 252 mg | 1350 mg | — | 0.5% (w/w) |
| Comparative Example 4-1 | 115 | 252 mg | 1350 mg | 26 mg (Cholesterol 1.92%*) | 0.5% (w/w) |
| Comparative Example 4-2 | 117 | 252 mg | 1350 mg | 47 mg (DOTAP 3.48%*) | 0.5% (w/w) |

*% (w/w) of release-controlling substance content relative to biodegradable polymer In order to confirm the release of liraglutide (API) in the microspheres including no hydrophobic amino acid (Comparative Example 1), microspheres including cholesterol (Comparative Example 4-1) and microspheres including DOTAP (Comparative Example 4-2) according to Table 7, the content and release rate of liraglutide (API) were confirmed according to the conditions of Testing Methods 1 and 2, the surface of the microspheres using SEM photographs was observed in accordance with the conditions in Testing Methods 3 and 4, and the average particle size (D[4,3]) of each microsphere was measured and the results are shown in the following Table 8 and FIGS. 4A and 4B.

TABLE 8

| Classification | Batch No. | Content (%) | Release (1 h) (%) | Average Particle Size (μm) | Properties |
|---|---|---|---|---|---|
| Comparative Example 1 | 111 | 100.51 | 15.76 | 42.29 | Many Pores |
| Comparative Example 4-1 | 115 | 106.94 | 18.66 | 39.86 | Many Pores |
| Comparative Example 4-2 | 117 | 81.84 | 18.06 | 88.09 | surface unevenness |

As shown in Table 8 and FIGS. 4A and 4B, when compared with the surface and the API release amount (FIG. 1A) of the microspheres of Comparative Example 1, it can be seen that Comparative Examples 4-1 and 4-2, which are microspheres including cholesterol or DOTAP, did not inhibit the initial burst release of API (liraglutide) or that the API content-lowering phenomenon occurred. In addition, even when the surface is confirmed by SEM, it can be confirmed that there are a large number of pores in the microspheres, or a smooth surface cannot be produced. Thus, the above results show that the initial burst release-inhibiting effect of the microspheres of the present invention is the specific effect of a hydrophobic amino acid in the PLGA microspheres.

Test Example 5: Confirmation of Release-Controlling Inhibitory Effect by Content of Hydrophobic Amino Acid In order to determine whether the release-inhibiting effect on the drug inside the microspheres in the microspheres of the present invention is affected by the content of the hydrophobic amino acid, the release of API in the microspheres and the nature of the microspheres were determined by the content of hydrophobic amino acids.

Leucine was used as the hydrophobic amino acid, and only the mixing of leucine in the preparation of the oil phase and/or the second water phase was different, while the microspheres were prepared according to the method for preparing microspheres described in Comparative Example 1. In addition, a microsphere (Comparative Example 5) including no hydrophobic amino acid was prepared and used as a control. The specific contents and mixing steps of the prescription and release-controlling components for the preparation of microspheres for each experimental group are as shown in the following Table 9. The release-controlling component is expressed as % (w/w) of the release-controlling component relative to the amount of the biodegradable polymer (PLGA) forming the microspheres.

TABLE 9

| Classification | Batch No. | W1 API (mg) | O Phase PLGA (mg) | O Phase Release Control Component | NaCl | W2 Phase (% (w/v)) Release Control Component |
|---|---|---|---|---|---|---|
| Comparative Example 5 | LRG84I-145 | 252 | 1350 | — | 0.5 | — |
| Example 3-1 | LRG84I-111 | 252 | 1350 | 0.07% (w/w) (Leucine) | 0.5 | — |
| Example 3-2 | LRG84I-137 | 252 | 1350 | 0.36% (w/w) (Leucine) | 0.5 | — |
| Example 3-3 | LRG84I-139 | 252 | 1350 | 1% (w/w) (Leucine) | 0.5 | — |
| Example 4-1 | LRG84I-146 | 252 | 1350 | 1% (w/w) (Leucine) | 0.5 | 0.5 (Leucine) |
| Example 4-2 | LRG84I-148 | 252 | 1350 | 1% (w/w) (Leucine) | 0.5 | 2 (Leucine) |
| Example 4-3 | LRG84I-149 | 252 | 1350 | 1% (w/w) (Leucine) | 0.5 | 0.05 (Leucine) |
| Example 4-4 | LRG84I-150 | 252 | 1350 | 1% (w/w) (Leucine) | 0.5 | 0.005 (Leucine) |

In order to confirm the release of liraglutide (API) in the microspheres including no hydrophobic amino acid (Comparative Example 5), microspheres including leucine in the oil layer (Examples 3-1, 3-2, and 3-2), and microspheres including leucine in the oil layer and W2 layer (Examples 4-1, 4-2, 4-3, and 4-4) according to Table 9, the content and the release rate of liraglutide (API) were determined according to the conditions of Testing Methods 1 and 2, the surface of the microspheres using SEM photographs was observed according to conditions of Testing Methods 3 and 4, and the average particle size (D[4,3]) of each microsphere was measured and the results are shown in the following Table 10, FIG. 5A to 5C, and FIG. 6A to 6D.

TABLE 10

| Classification | Batch No. | API content (%) | Release (1 h) (%) | Average Particle Size (μm) | Properties |
|---|---|---|---|---|---|
| Comparative Example 5 | LRG84I-145 | 99.09 | 9.49 | 33.42 | Many Pores |
| Example 3-1 | LRG84I-111 | 96.45 | 5.64 | 32.33 | Slightly Reduced Pores |
| Example 3-2 | LRG84I-137 | 99.48 | 3.91 | 33.33 | Reduced Pores |
| Example 3-3 | LRG84I-139 | 101.45 | 1.91 | 28.33 | Bad Microsphere Shape |
| Example 4-1 | LRG84I-146 | 103.13 | 3.51 | 37.85 | No Pores Uniform Microsphere Shape |
| Example 4-2 | LRG84I-148 | 104.08 | 2.00 | 40.63 | No Pores Uniform Microsphere Shape |
| Example 4-3 | LRG84I-149 | 95.71 | 5.37 | 35.26 | Bulky Microsphere |
| Example 4-4 | LRG84I-150 | 99.2 | 7.21 | 31.48 | Bulky Microsphere |

In addition, the physicochemical properties (bulk density (BD), suspension density, zeta-potential) of each of the microspheres were measured according to Testing Methods 5 to 8, and are shown in Table 11.

TABLE 11

| Classification | Batch No. | BD (g/ml) | Suspension Density (g/cm³) | Zeta-Potential (mV) |
|---|---|---|---|---|
| Comparative Example 5 | LRG84I-145 | 0.34 | 1.06365 Good Injection Dispersibility | -7.99 |
| Example 3-1 | LRG84I-111 | 0.33 | 1.06158 Good Injection Dispersibility | -8.54 |
| Example 3-2 | LRG84I-137 | 0.32 | 1.06858 Good Injection Dispersibility | -9.97 |
| Example 3-3 | LRG84I-139 | 0.31 | 1.05858 Good Injection Dispersibility | -10.43 |
| Example 4-1 | LRG84I-146 | 0.175 | 1.00858 Good Injection Dispersibility | -10.43 |
| Example 4-2 | LRG84I-148 | 0.36 | 1.064582 Good Injection Dispersibility | -22.50 |
| Example 4-3 | LRG84I-149 | 0.085 | 0.9542 Poor Injection Dispersibility | -5.41 |
| Example 4-4 | LRG84I-150 | 0.057 | 0.9254 Poor Injection Dispersibility | -4.72 |

As shown in Tables 10 and 11 above, it can be confirmed that leucine, which is a hydrophobic amino acid of Examples 3-1 to 3-3 and Examples 4-1 to 4-4, has an the initial burst release-inhibiting effect on API in the microspheres included in the O layer or the O and W2 layers. In particular, in the case of the microspheres of Example 3-2, it can be confirmed that it is a preparation with excellent API release inhibition and a uniform shape of the surface and the microspheres. Further, in this case, the injection dispersibility is good, the zeta-potential is appropriate, and when the microspheres are suspended in water for injection, dispersion is excellent, and it was found that the composition has suitable characteristics as a formulation for injection.

However, it was confirmed that when leucine was included alone in the O layer, and the content of leucine compared to the polymer was 0.07% (w/w), the release-controlling effect was slightly lowered.

In addition, even in the case where leucine is included in the O layer, when leucine is included in an amount of 0.05% (w/v) or less with respect to the whole W2 water phase solution, the bulk density value (bulk density, BD, g/ml) of the particles was too low, and it was found that the particles exhibited properties that were difficult to use as a formulation for injection.

However, in the case of the microspheres of Examples 4-1 and 4-2, it can be seen that the inclusion of leucine in both the O layer and the W2 layer allows better control of the initial burst release of API and provides formulations with very uniform shape of microspheres. In particular, it can be seen that the suspension density is appropriate, the injection dispersibility is good, and the zeta-potential value is significantly excellent. This means that the dispersibility of the microspheres in water for injection is excellent, and the microspheres of the present invention have significantly excellent property as an injection preparation.

Further, as shown in FIG. 7, DSC analysis of the microspheres of Comparative Example 5, Comparative Example 4-2, and Example 4-1 confirmed that there was no change in the thermal behavior and crystal form of the polymer and the drug, even when leucine was included in the microspheres.

As shown in FIG. 8, the long-term release behavior of the microspheres of Comparative Example 5, Example 3-2, and Example 4-2 was confirmed for 35 days, and as a result, it was confirmed that the drug was continuously released in a Zero-order manner for 4 weeks while the initial elution of the microspheres of the present invention including leucine was maintained at 5% or less in 1 day of control and 15% or less for 4 days. This shows that PLGA microspheres including leucine in the oil layer or the oil layer and W2 layer of the present invention have a very excellent effect of inhibiting an initial burst release and maintaining a sustained-release, and have properties for use as a depot.

Test Example 6: Determination of in Vivo Initial Burst Release-Controlling and Sustained-Release Effect Experiments were performed to confirm the in vivo drug release behavior of microspheres.

Microspheres (28 mg/kg as liraglutide) prepared according to Example 1-4 of Table 1 and Comparative Example 1 were subcutaneously administered to 5 eight-week-old SD rats (male) with an average body weight of 300 g, and blood was collected at 0, 1, 2, 4, 8, 10, 12, 24, 48, 96, 168, 336, 504, 672, 1008 hours.

Thereafter, the concentration of liraglutide in blood at each time point in plasma samples of SD rats was measured using an enzyme-linked immunosorbent assay (ELISA). At this time, GLP-1 (active) ELISA (IBL, Germany) was used as a kit.

The change in the concentration of liraglutide over time is shown in FIG. 9. The results in FIG. 9 describe the average values for 5 mice used in the experiment.

As shown in FIG. 9, it can be seen that the microspheres including a hydrophobic amino acid (Examples 1-4) have a 4.4-fold reduction in the maximum blood concentration (Cmax) of the physiological active material compared to the microspheres of Comparative Example 1, which is a general microparticle form, and have a superior sustained-release effect up to day 42.

What is claimed is:

1. A depot composition comprising microspheres comprising an oil layer (O layer) comprising a biodegradable polymer and a hydrophobic amino acid,
   wherein the microspheres comprise a hydrophobic amino acid in an amount of less than 1.5 parts by weight in an oil phase solution, based on 100 parts by weight of the biodegradable polymer.

2. The depot composition of claim 1, wherein the microspheres further comprise a hydrophobic amino acid in a water phase layer.

3. The depot composition of claim 1, wherein the microspheres have a bulk density (BD) of 0.1 g/ml or more and a zeta-potential between −8 mV and −30 mV.

4. The depot composition of claim 1, wherein the hydrophobic amino acid is selected from the group consisting of valine, methionine, alanine, phenylalanine, tryptophan, isoleucine and leucine.

5. The depot composition of claim 2, wherein the microspheres comprise a hydrophobic amino acid in an amount of 0.05% (w/v) to 25% (w), based on the entire water phase solution.

6. The depot composition of claim 1, wherein the biodegradable polymer is a polymer comprising lactide and glycolide as monomers.

7. The depot composition of claim 6, wherein the biodegradable polymer has an inherent viscosity (25° C.) of 0.35 to 0.65 dL/g.

* * * * *